United States Patent
Chadha et al.

(10) Patent No.: US 11,614,392 B2
(45) Date of Patent: Mar. 28, 2023

(54) AEROSOL SENSOR FOR PERFORMING COUNTING AND MULTIWAVELENGTH OR MULTIANGLE MEASUREMENT IN COMBINATION

(71) Applicant: Applied Particle Technology, Inc., St. Louis, MO (US)

(72) Inventors: Tandeep S. Chadha, Boise, ID (US); Jiaxi Fang, Menlo Park, CA (US); Pratim Biswas, Chesterfield, MO (US)

(73) Assignee: Applied Particle Technology, Inc., St. Louis, MO (US)

( * ) Notice: Subject to any disclaimer, the term of this patent is extended or adjusted under 35 U.S.C. 154(b) by 574 days.

(21) Appl. No.: 16/705,648

(22) Filed: Dec. 6, 2019

(65) Prior Publication Data
US 2020/0182765 A1 Jun. 11, 2020

Related U.S. Application Data

(60) Provisional application No. 62/777,016, filed on Dec. 7, 2018.

(51) Int. Cl.
*G01N 15/02* (2006.01)
*G01N 15/14* (2006.01)

(52) U.S. Cl.
CPC ..... *G01N 15/0211* (2013.01); *G01N 15/1404* (2013.01); *G01N 15/1436* (2013.01);
(Continued)

(58) Field of Classification Search
CPC ....... G01N 15/0211; G01N 2015/0238; G01N 15/0205; G01N 2015/0046;
(Continued)

(56) References Cited

U.S. PATENT DOCUMENTS 4,781,460 A 11/1988 Bott
5,949,001 A * 9/1999 Willeke ............. G01N 15/0255
356/336
(Continued)

FOREIGN PATENT DOCUMENTS

WO WO2003021231 A2 3/2003

OTHER PUBLICATIONS

R. G. Pinnick, J. M. Rosen, D. J. Hoffman, "Measured Light-Scattering Properties of Individual Aerosol Particles Compared to Mie Scattering Theory", Applied Optics, vol. 12, No. 1, p. 37-41 (Jan. 1973).
(Continued)

*Primary Examiner* — Dominic J Bologna
*Assistant Examiner* — Amanda Merlino
(74) *Attorney, Agent, or Firm* — Lemnia Summerfield Katz LLC

(57) ABSTRACT

A method and apparatus for particle counting and wavelength or angle performed in combination in order to characterize an aerosol is disclosed. In one example, data regarding particle counting (such as from an optical particle sensor) and data regarding angle or wavelength (such as from an ensemble measurement sensor) may be separately generated, with the separately generated data being analyzed in combination in order to characterize the aerosol. In another example, data regarding particle counting and regarding angle or wavelength may be generated in combination in order to characterize the aerosol.

31 Claims, 21 Drawing Sheets

(52) U.S. Cl.
    CPC ............... *G01N 2015/0238* (2013.01); *G01N 2015/1486* (2013.01)

(58) Field of Classification Search
    CPC ........... G01N 15/1404; G01N 15/1436; G01N 2015/1486; G01N 15/1459
    See application file for complete search history.

(56) References Cited

U.S. PATENT DOCUMENTS

| | | |
|---|---|---|
| 6,794,671 B2 | 9/2004 | Nicoli |
| 9,297,737 B2 | 3/2016 | Trainer |
| 2010/0220323 A1 | 9/2010 | Herzog |
| 2010/0288921 A1 | 11/2010 | Wang |
| 2015/0355084 A1* | 12/2015 | White ................ G01N 15/1434 506/35 |
| 2016/0216193 A1* | 7/2016 | Han ................... G01N 15/1459 |
| 2016/0258916 A1* | 9/2016 | Rodes ................ G01N 15/0255 |
| 2019/0277822 A1 | 9/2019 | Chadha |
| 2019/0308202 A1 | 10/2019 | Biswas |

OTHER PUBLICATIONS

PCT International Search Report and Written Opinion of International Searching Authority, corresponding to PCT International Application No. PCT/US2019/064848 dated Feb. 13, 2020.

\* cited by examiner

AEROSOL SENSOR FOR PERFORMING COUNTING AND MULTIWAVELENGTH OR MULTIANGLE MEASUREMENT IN COMBINATION

REFERENCE TO RELATED APPLICATION

The application claims the benefit of U.S. Provisional Patent Application No. 62/777,016 filed on Dec. 7, 2018, the entire contents of which are incorporated by reference herein.

TECHNICAL FIELD

The technical field relates to aerosol sensors. More specifically, the technical field relates aerosol sensors that performing counting and multiwavelength or multiangle measurement in combination.

BACKGROUND

Aerosols sensors are used to characterize particulate matter, and include different types. One type of aerosol sensor is an optical particle counter (OPC) sensor. The OPC sensor operates based upon light scattering, light obscuration, or direct imaging. In practice, a high intensity light source is used to illuminate the particle as it passes through the detection chamber. The particle passes through the light source (such as a laser or a halogen light) and if light scattering is used, then the redirected light is detected by a photo detector. In this regard, the particles are counted by the OPC sensor one at a time, with the OPC sensor counting and sizing the number of particles in an environment, such as in the air. The data generated by the OPC sensor may be used to determine the quantity of particles in the environment, such as inside a building or in the ambient air.

Another type of aerosol sensor is an ensemble particle scattering measurement (EPSM) sensor, such as a multi-wavelength EPSM sensor or a multiangle EPSM sensor. Unlike OPC sensors, EPSM sensors analyze groups of particles at a time by analyzing the scattering at multiple wavelengths or multiple angles in order to characterize the particles in the aerosol.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings.

DETAILED DESCRIPTION

Figure 1A:
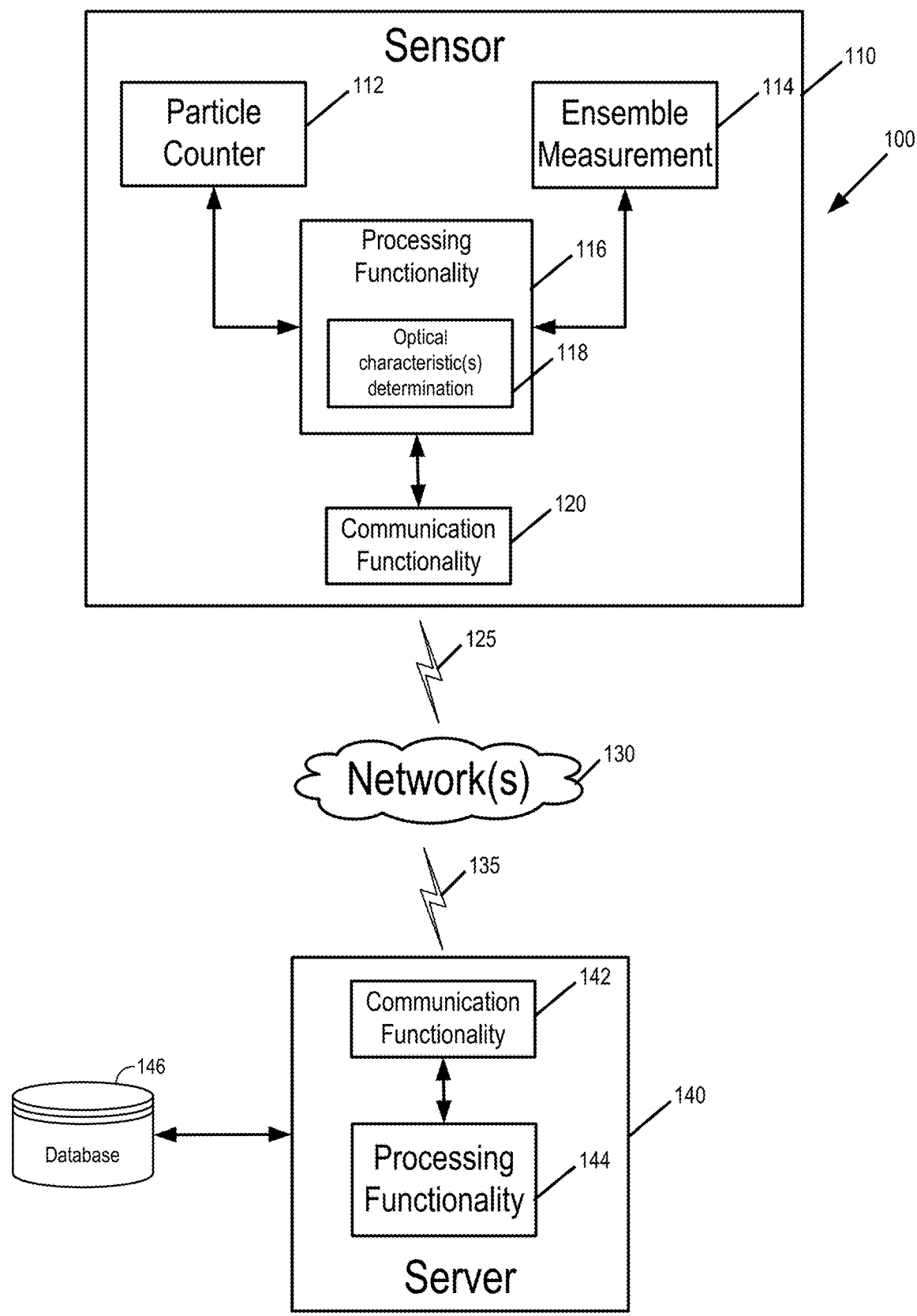
FIG. 1A illustrates a first block diagram of the sensor communicating with an external server, where the processing (such as the determination as to one or more optical characteristics of the aerosol) is performed at the sensor.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

The background discusses multiple types of sensors that characterize the aerosol. These multiple types of sensors are limited in several respects. First, conventional optical-based techniques for measuring particulate matter may only measure number concentration, mass, or particle size. Second, previous sensors either use a particle counter approach scattered light response from a single particle measured, or use an ensemble approach where the total photometric response is measured from particles. Third, typical products use discrete light sources or measure responses at discrete wavelengths. Fourth, conventional sensors cannot provide significant data on the optical properties or provide accurate distinction of the composition.

In one implementation, a sensor system is disclosed that includes particle counting and wavelength or angle performed in combination. In a first implementation, particle counting data and ensemble measurement data are analyzed in combination in order to characterize the aerosol. In particular, the aerosol sensor system may include: the OPC sensor configured generate particle counting data; an ensemble measurement sensor configured to generate ensemble measurement data; and analytical or processing functionality to analyze the particle counting data (or data derived from the particle counting data) and the ensemble measurement data (or data derived from the ensemble measurement data) in combination in order to characterize the aerosol. The analysis is performed in combination on the particle counting data and the ensemble measurement data even though the OPC sensor and the ensemble measurement sensor are different in several respects including: (1) OPC-type sensors that analyze a single particle at a time whereas ensemble measurement-type sensors that analyze groups of particles; and (2) OPC-type sensors that focus on the size/count of the particles whereas multiwavelength or multi-angle that focus on the response at one or more wavelengths or one or more angles, respectively.

As discussed in more detail below, the OPC sensor may generate one or more types of OPC data. Types of OPC data include, but are not limited to, pulse height distributions, size distribution data, and mass concentrations. Other types of OPC data are contemplated. For example, the OPC may generate pulse height distributions, which in turn may be used to calculate the size distribution, and thereafter the mass measurement. One or more types of OPC data may be analyzed in combination with the ensemble measurement data to identify a correlation (e.g., a line fit). Various types of in-combination analysis are contemplated including graphing (e.g., graphing a type of OPC data versus a type of ensemble measurement data), mathematical analysis (e.g., solving equations using both OPC data and ensemble measurement data), machine learning (e.g., neural networks or other type of machine learning which analyzes and identifies a relationship between the OPC data and the ensemble measurement data), clustering, etc. Further, various types of correlations are contemplated, including a line or curve fit to the graph, or an output of the mathematical equations. The correlation between the OPC data and the ensemble measurement data is indicative of at least one aspect of a material. In one implementation, the correlation may be indicative of a property of the material (such as an optical property of the material, including the refractive index). Alternatively, or in addition, the correlation may be indicative of the material itself.

As one example, typical OPC sensors output size distribution data (e.g., size-based number concentration). As such, in one implementation, the size distribution data (or data based on the size distribution data) may be analyzed in combination with the ensemble measurement data in order to identify a correlation (e.g., a line fit, via machine learning, or the like), with the identified correlation being used to characterize the aerosol (e.g., determine one or more optical properties of the aerosol). As one example, the methodology may use the size distribution data output from the OPC device in order to generate a mass concentration for the measurement. Thus, at each time point, the mass concentration for the measurement may be graphed in combination with the ensemble measurement (e.g., the scattering spectra). As described in further detail below, the OPC sensor and the ensemble measurement sensor may output at the same time points (e.g., as indicated by time-stamps on the data of t=0.1, t=0.2, etc.). The outputs at the same time point (e.g., t=0.1) for each of the OPC data and the ensemble measurement data may be analyzed (e.g., graphed) relative to one another. In one implementation, a mass measurement may be calculated from the size distribution measurement of the OPC at t=0.1 and may be graphed against the scattering spectra at t=0.1. This process may be repeated (e.g., 10 times per second) until sufficient data points are graphed in order to fit a line or curve (or other type of correlation) to the data points in the graph. The correlation identified in the data points between the mass measurement versus the scattering spectra may then be matched to one of a plurality of previously measured correlations.

In one or some embodiments, the OPC may necessitate a certain amount of time to obtain a size distribution (e.g., in order to count a sufficient number of particles in order to integrate the size distribution over a certain amount of time). Within that integral time, the output of the OPC may be compared with the output of the ensemble measurement.

In one implementation, previously measured correlations indicate different optical properties of the aerosol (e.g., scattering versus absorbing, such as pure scattering, pure absorbing, strongly scattering, strongly absorbing, etc.). For example, the correlation (e.g., the line) identified in the data points between the mass measurement versus the scattering spectra may match to a first previously measured correlation, with the first previously measured correlation indicating strongly absorbing. As another example, the correlation identified in the data points between the mass measurement versus the scattering spectra may match to a second previously measured correlation, with the second previously measured correlation indicating strongly scattering.

Thus, in one implementation, the correlation may solely be used to determine a general indication of the optical properties (e.g., scattering versus absorbing, etc.). Alternatively, or in addition, the correlation may be used to determine an identification of one or more aspects of the aerosol, such as identification of the aerosol itself, the general optical nature of the aerosol, and/or an indication of the refractive index of the aerosol.

Thus, the aerosol sensor system may comprise in-situ measurements and determinations of comprehensive aerosol properties, such as, for example, any one, any combination or all of: size; particulate mass; and optical speciation (e.g., optical properties, such as refractive index, composition, determination of scattering/absorbing, fractal index, etc.). This is unlike conventional aerosol sensors that are unable to measure all of these properties at once. Specifically, typical systems are only able to provide particle counts, particle size, or total concentration and have significant limitations on the concentration range which can be measured.

Thus, in one or some embodiments, the aerosol sensor system may be configured to identify a composition from a plurality of potential compositions (e.g., at least three compositions, at least four compositions, at least five compositions, at least ten compositions, at least twenty compositions, etc.). Alternatively, the aerosol sensor system may be configured to identify the composition of the aerosol from only two compositions (e.g., determination as to whether the aerosol is more likely smoke or typical dust; differentiate between type A dust and type B dust).

Still alternatively, the aerosol sensor system may be configured to determine whether the aerosol has a single composition present (e.g., is there smoke present or not smoke present). In one specific embodiment, the material within the aerosol is not previously identified (with the aerosol sensor system configured to identify the material). In an alternate embodiment, the material within the aerosol is already identified. In such an instance, the aerosol sensor system may receive, via an interface, the indication of the material. In practice, the aerosol sensor system's notification of the material may be used in one of several ways. In one way, the notification of the material may be used to calibrate the aerosol sensor system. In another way, the notification of the material may be used to reduce the number of iterations (e.g., the scattering data may be inverted more accurately in order to obtain a more accurate size distribution while requiring fewer (or no) iterations). Likewise, the notification of the material may be in one of several ways. In one way, the input may explicitly indicate to the aerosol sensor system the material (e.g., input of an indication of "black carbon" as the material via a port to the aerosol sensor system). In another way, the input may implicitly indicate to the aerosol sensor system the material (e.g., input of an indication of a certain region (e.g., southern California), such as via a communication received from an external device or via a communication received from a GPS sensor as part of the aerosol sensor system; the aerosol sensor system may identify a certain type of composition indigenous to the certain region (e.g., certain type of composition indicative of wildfires in southern California)).

As discussed above, another type of OPC data comprises pulse height distributions obtained from the OPC. The pulse height distributions, using data inversion, are converted into the size distribution by assuming a refractive index of the aerosol. For example, data inversion from the pulse height distribution data may be performed using an assumed refractive index. In particular, the methodology may use some or all of the pulse height distribution data from the OPC and the multi-wavelength spectra to invert an accurate size distribution based on the Mie Scattering theory and the assumed refractive index for the aerosol. See R. G. Pinnick, J. M. Rosen, D. J. Hoffman, "Measured Light-Scattering Properties of Individual Aerosol Particles Compared to Mie Scattering Theory", Applied Optics, Vol. 12, No. 1, pg. 37-41 (January, 1973), incorporated by reference herein in its entirety. Using the determined size distribution, the methodology may follow that discussed above whereby: the size distribution is used to generate the mass concentration for the measurement; the mass measurement and scattering spectra are analyzed in combination (e.g., graphed for one, some, or all obtained time points); a correlation of the analysis is identified (e.g., a line fit); and optical characteristics are identified (e.g., a refractive index is determined). This procedure may be iterated one or more times by taking the determined refractive index as the assumed refractive index (used for the data inversion from the pulse height distribution data). Iteration may continue until the assumed refractive index (used for data inversion) is equal or nearly equal (within a preset amount) of the determined refractive index. Thus, the iterative approach may be used until an accurate size distribution and refractive index are obtained. In particular, the size distribution may be initially calculated using an assumed refractive index, as discussed further below. Thereafter, the calculated size distribution may be used to calculate the refractive index. The system may then compare the calculated refractive index with the assumed refractive index. If the assumed refractive index and calculated refractive index are within tolerance, it may be assumed that the calculated size distribution is correct. Alternatively, the system may iterate again by using the calculated refractive index generated in a current iteration as the assumed refractive index in the next iteration (with iterations continuing until the assumed refractive index and calculated refractive index are within tolerance).

As discussed above, one type of in-combination analysis comprises an equation-based in-combination analysis. For example, the in-combination analysis may use the pulse height distributions obtained from the OPC and the scattering spectra from the multiangle ensemble measurement to invert an accurate size distribution by equations based on the Mie Scattering theory and refractive index for the aerosol. Thus, various types of mathematical analysis, other than graphing, are contemplated and may be used to define a relationship between the particle counting data and ensemble measurement data, and to determine characteristic(s) of the aerosol based on the defined relationship.

In one implementation, the aerosol sensor system includes separate chambers for the OPC sensor and the ensemble measurement sensor. In a first specific implementation, the separate chambers for the OPC sensor and the ensemble measurement sensor are housed in a single unitary housing. Alternatively, the separate chambers for the OPC sensor and the ensemble measurement sensor are housed in separate housings (e.g., an OPC sensor in an optical particle counter housing that outputs its data to a common controller and an ensemble measurement in an ensemble measurement device housing that output its data to the common controller for in-combination analysis of the OPC data and the ensemble measurement data, with the optical particle counter housing being separate from the ensemble measurement device housing). Further, in one or some embodiments, the aerosol sensor system consists of the OPC sensor and the ensemble measurement sensor (and does not include other sensors). Alternatively, the aerosol sensor system comprises at least three sensors, such as the OPC sensor, the ensemble measurement sensor, and at least a third sensor (generating a third type of measurement), with the data from each of the three sensors being analyzed in order to characterize the aerosol.

The aerosol sensor system may analyze the data in combination. In one implementation, the analysis may be performed locally (e.g., in the same housing that houses the separate chambers) and thus may operate in real-time or in near real-time to determine the optical characteristic(s). Alternatively, the analysis may be performed remotely (e.g., remotely from the housing that houses the separate chambers, such as a server).

In a second implementation, the aerosol sensor system may obtain the data for particle counting and wavelength or angle in combination. In a specific implementation, the particle counting wavelength/angle measurement sensor generates data regarding particle counting for at least one of wavelength (such as at a single wavelength or at multiple wavelengths) or angle (such as at a single angle or at multiple angle) in a common chamber. The particle counting wavelength/angle measurement sensor integrates the optical particle counting and the ensemble measurement discussed above. The aerosol sensor system discussed above in the first implementation includes two separate sensors, the OPC sensor and the ensemble measurement sensor, and uses separate chambers to generate the OPC data and the multi-wavelength or multiangle data. In this regard, there is no direct connection between the particles counted (and the attendant size distribution data) to the multiwavelength or multiangle data (e.g., the particle that is being counted in one chamber is not the same particle being scattered to sense for wavelength or angle in another chamber). In contrast, generating particle counting and multiwavelength or multiangle data in combination results in a direct connection between the two (e.g., the same particle generates counting (and size data) and generates the multiwavelength or multiangle data).

In a specific implementation, the particle counting wavelength/angle measurement sensor includes an optical particle counter, a single radiation source (such as a well-collimated white light source (such as a white laser or lens arrangement) or multi-wavelength collimated lasers), and a spectrometer. The arrangement results in generating a pulse height distribution at one or more wavelength (such as a plurality of wavelengths) for each individual aerosol particle, and further generates accurate size distribution and refractive index for each individual aerosol particle.

The present application thus discloses an aerosol sensor system. An aerosol is one example of a fluid. Generally speaking, an aerosol comprises a suspension of fine solid particles or liquid droplets, in air or another gas. In this regard, any discussion herein with regard to aerosols may equally be applied to any particle or droplets suspended in a fluid, such as any colloidal mixture subject to monitoring. So that, the teachings with regarding to the aerosol sensor system may likewise be applicable to a fluid sensor system, or the like.

Referring to the figures, FIG. 1A illustrates a first block diagram 100 of the sensor 110 communicating with an external server 140, where the processing (such as the determination as to one or more optical characteristics of the aerosol) is performed at the sensor 110. Sensor 110 includes particle counting functionality 112 (such as implemented by an OPC sensor) and ensemble measurement functionality 114 (such as implemented by a multiwavelength EPSM sensor or a multiangle EPSM sensor).

The data generated by the particle counting functionality 112 and the ensemble measurement functionality 114 are input to the processing functionality 116. As discussed in more detail below, the processing may include determining one or more optical characteristics of the aerosol, such as performed locally at the sensor 110 by optical characteristic(s) determination 118. In one implementation, optical characteristic(s) determination 118 is performed by an onboard processor, which may apply data inversion and analysis using the size data and total light scattered spectrum to calculate optical properties such as refractive index speciation, other properties. Optionally, once the optical characteristics, such as the refractive index, are known, the material associated with the particulates in the aerosol may be identified. In turn, the source of the material in the aerosol may likewise be identified. For example, based on the readings and the analysis, the particulates may be identified as carbon-based (based on the identified optical characteristic being more absorbing) or inorganic-based (based on the identified optical characteristic being more scattering).

In one implementation, sensor 110 may be configured to determine the optical characteristic(s) in real-time or near real-time. Further, as discussed below with regard to FIG. 9, the processing functionality 116 may include at least one processor (or other type of computing functionality) and at least one memory. The processing functionality 116 may transmit, using communication functionality 120 via wired and/or wireless communication functionality 125, 135 and network(s) 130 to server 140, one or both of data (such as one or both of the data generated by the particle counting functionality 112 or the ensemble measurement functionality 114) or the output of the optical characteristic(s) determination 118. As discussed below, communication functionality 120 may comprise wireless or wired communication, such as near field (e.g., Bluetooth or the like), mid-field (e.g., Wi-Fi or the like) or far field (e.g., cellular or the like) wireless communication. Further, network(s) 130 may comprise one or more types of wired or wireless networks.

Server 140 may comprise a server that communicates via the Internet that is standalone or part of a cloud computing architecture. Server 140 includes communication functionality 142, which enables transmitting to and receiving from network(s) 130. Server further includes processing functionality 144, which may comprise at least one processor and at least one memory. Finally, server 140 may be configured to communicate with an external database 146, which may be used to store one or both of data (such as one or both of the data generated by the particle counting functionality 112 (such as the raw data from the OPC) or the ensemble measurement functionality 114) or the output of the optical characteristic(s) determination 118. Though database 146 is depicted as separate from server 140, database 146 may be incorporated within server 140.

Figure 1B:
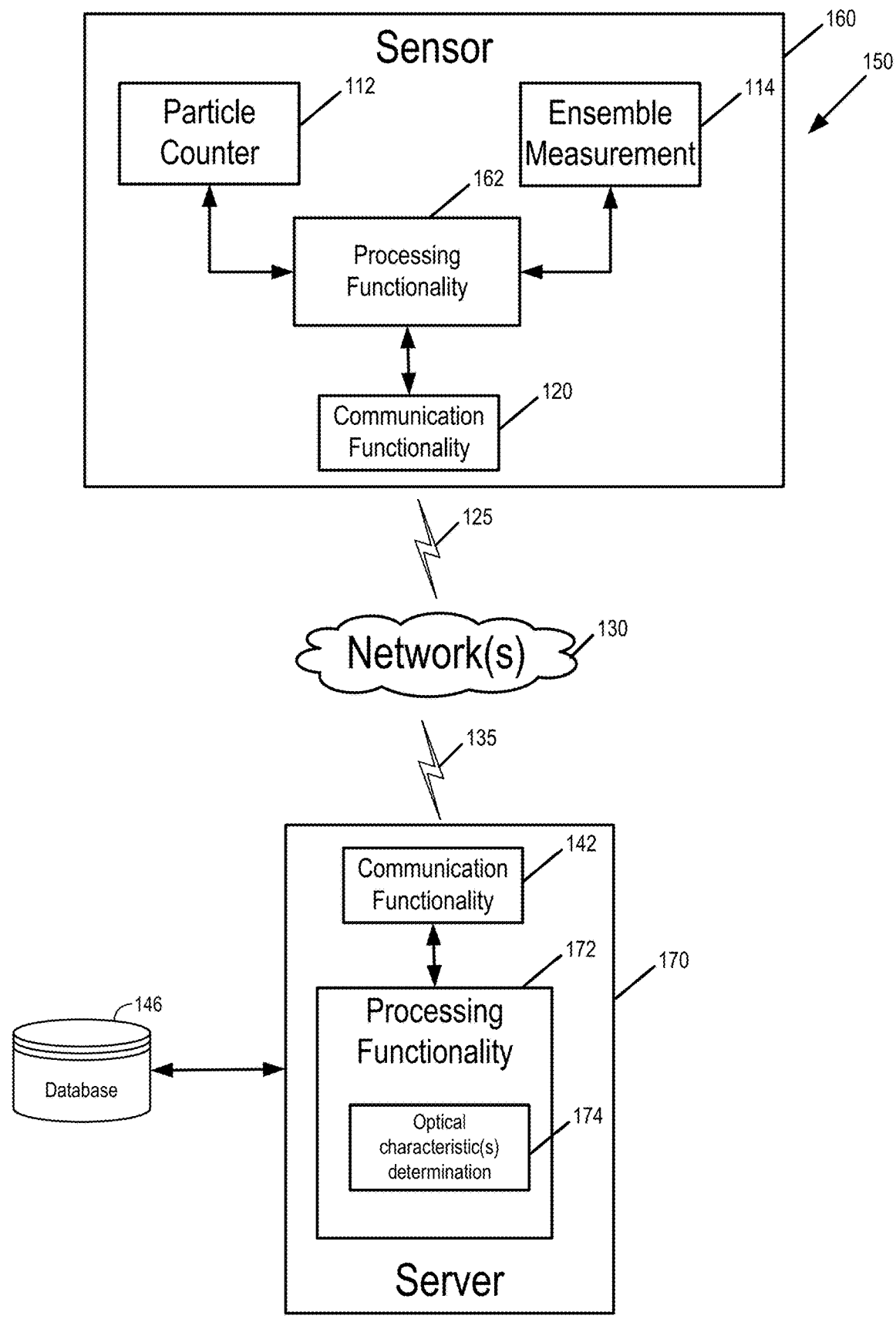
FIG. 1B illustrates a second block diagram of the sensor communicating with an external server, where the processing (such as the determination as to one or more optical characteristics of the aerosol) is performed at the server.

FIG. 1B illustrates a second block diagram 150 of the sensor 160 communicating with an external server 170, where the processing (such as the determination as to one or more optical characteristics of the aerosol) is performed at the server 170. As shown in FIG. 1B, the optical characteristic(s) determination 174 is performed within processing functionality 172 of server 170, instead of within processing functionality 162 of sensor 160. Thus, in one implementation, the size data and full response spectrum may be transmitted wirelessly from sensor 160 to a remote source for processing (such as server 170).

Figure 2A:
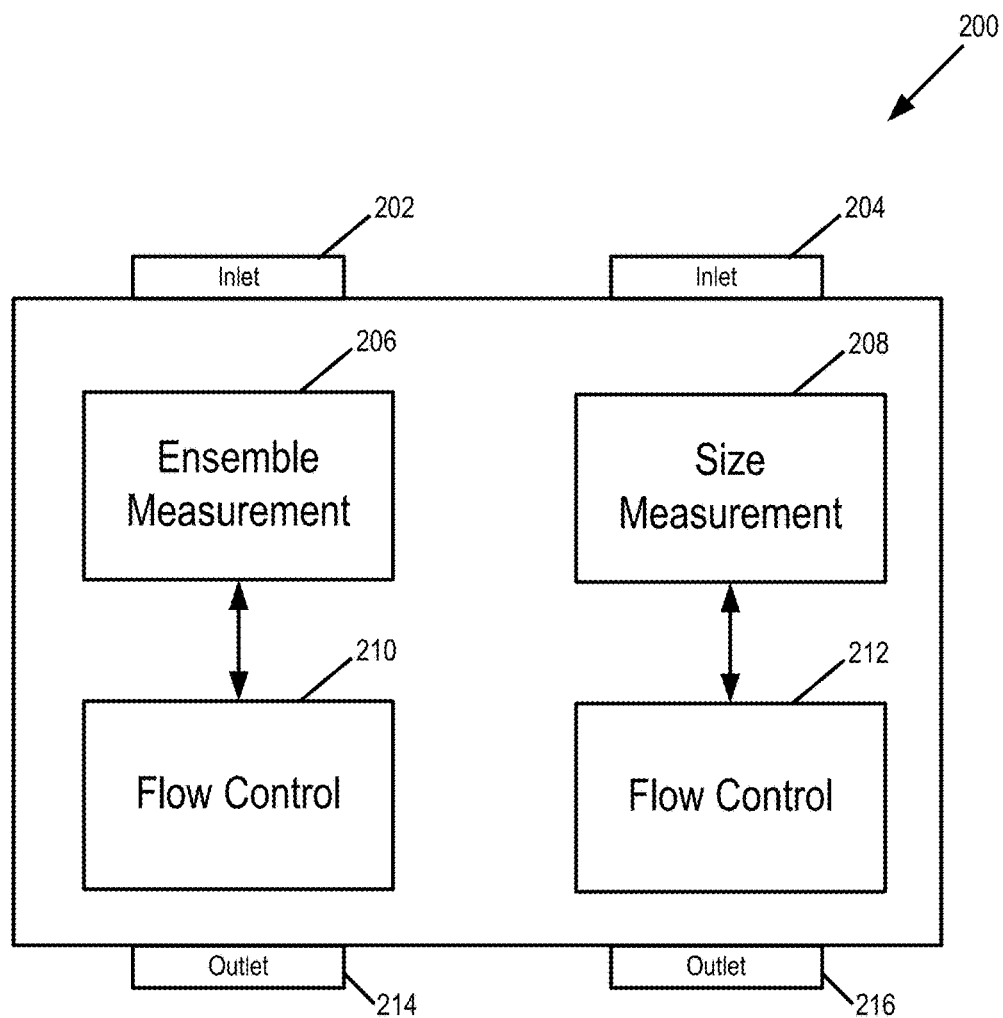
FIGS. 2A-C illustrate different physical layouts of the ensemble measurement and the size measurement.
Figure 2B:
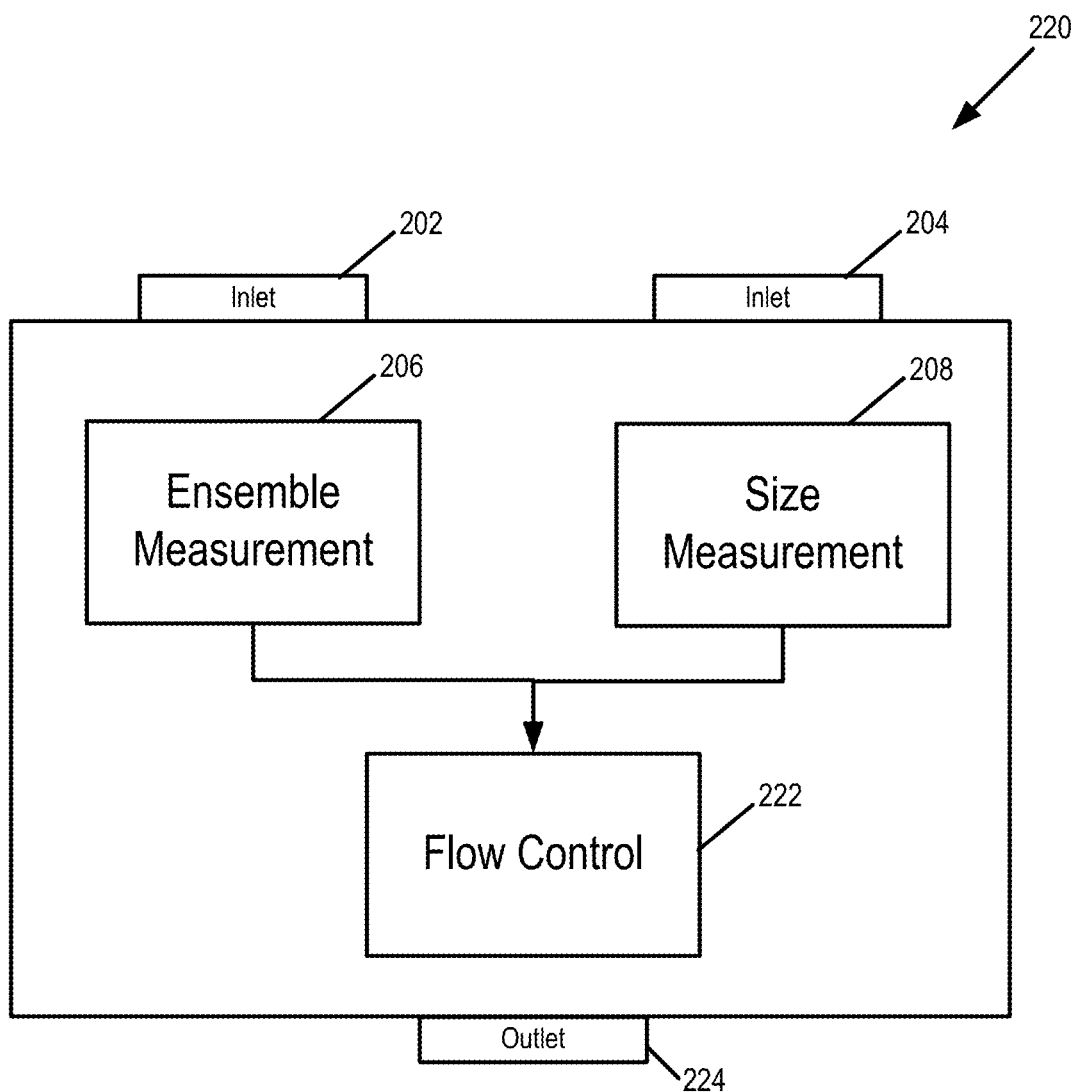
Figure 2C:
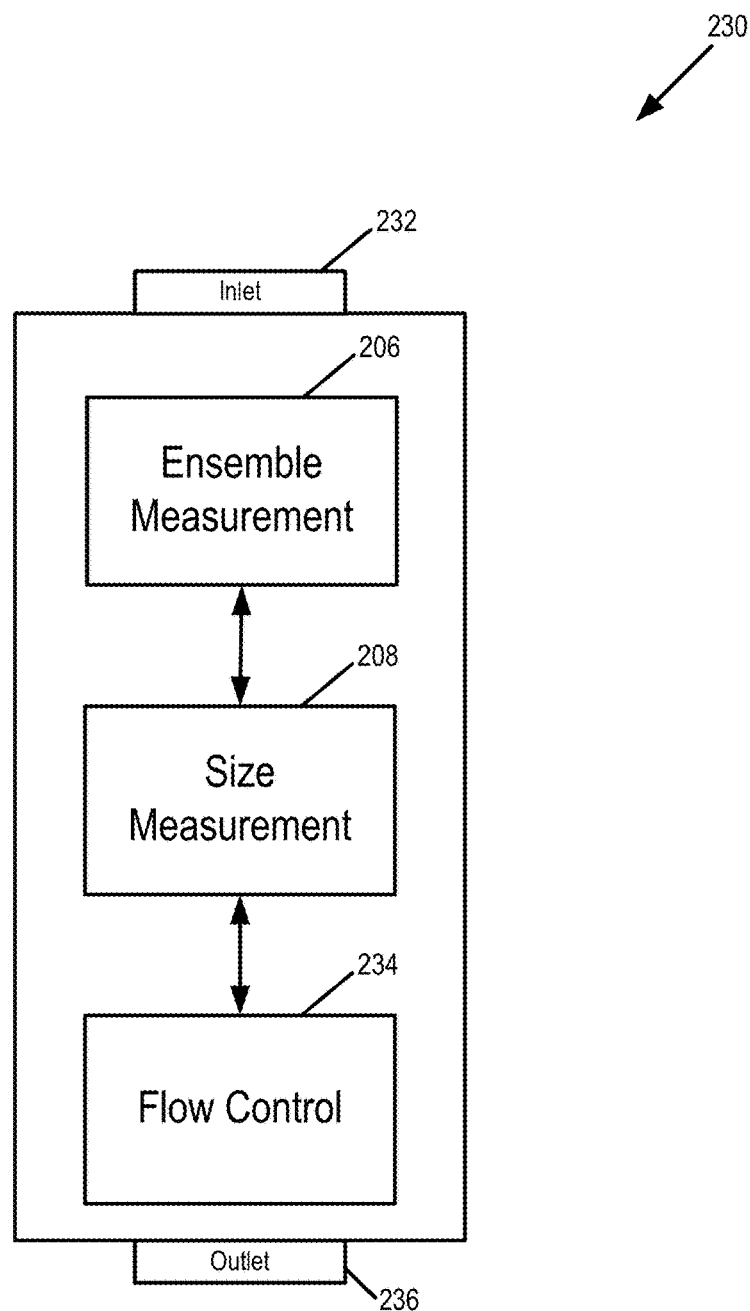

FIGS. 2A-C illustrate different physical layouts of the ensemble measurement and the size measurement. Specifically, FIG. 2A illustrates a block diagram 200 of separate inlets 202, 204 and outlets 214, 216 for the ensemble measurement 206 and the size measurement 208, with each having a respective flow control 210, 212. A flow control pump, which may be an example of flow control 210, 212, may be used to ensure that the detection zone within the respective sensor has a well-defined flow profile containing airborne particulates. For example, using flow control 210 for an ensemble measurement sensor (e.g., such as a sensor that uses white LED light sources) enables a well-controlled flow profile in the light detection zone, thereby improving scattering signal quality. In this implementation, the flow of particles is entirely separate and in parallel for the ensemble measurement 206 and the size measurement 208. Various flow rates are contemplated. Example flow rates are in the range of 0.1-5 liters/minute. Nevertheless, greater or less flow rates are contemplated. Further, in one or some embodiments, knowledge of flow conditions (e.g., flow rate) are contemplated in order to determine the concentrations as disclosed herein. In a specific embodiment, flow control is performed for the knowledge of the flow conditions.

FIG. 2B illustrates a block diagram 220 of separate inlets 202, 204 and a common outlet 224 for the ensemble measurement 206 and the size measurement 208, with each having a common flow control 222. In this implementation, the flow of particles is interdependent for the ensemble measurement 206 and the size measurement 208. FIG. 2C illustrates a block diagram 230 of a common inlet 232 and a common outlet 236 for the ensemble measurement 206 and the size measurement 208, with each having a common flow control 234. In this implementation, the flow of particles is in series for the ensemble measurement 206 and the size measurement 208. The layouts for FIGS. 2A-C are merely for illustration purposes to show the different layouts in which the ensemble measurement and the size measurement may be integrated within the sensor. Other layouts are contemplated.

Figure 3A:
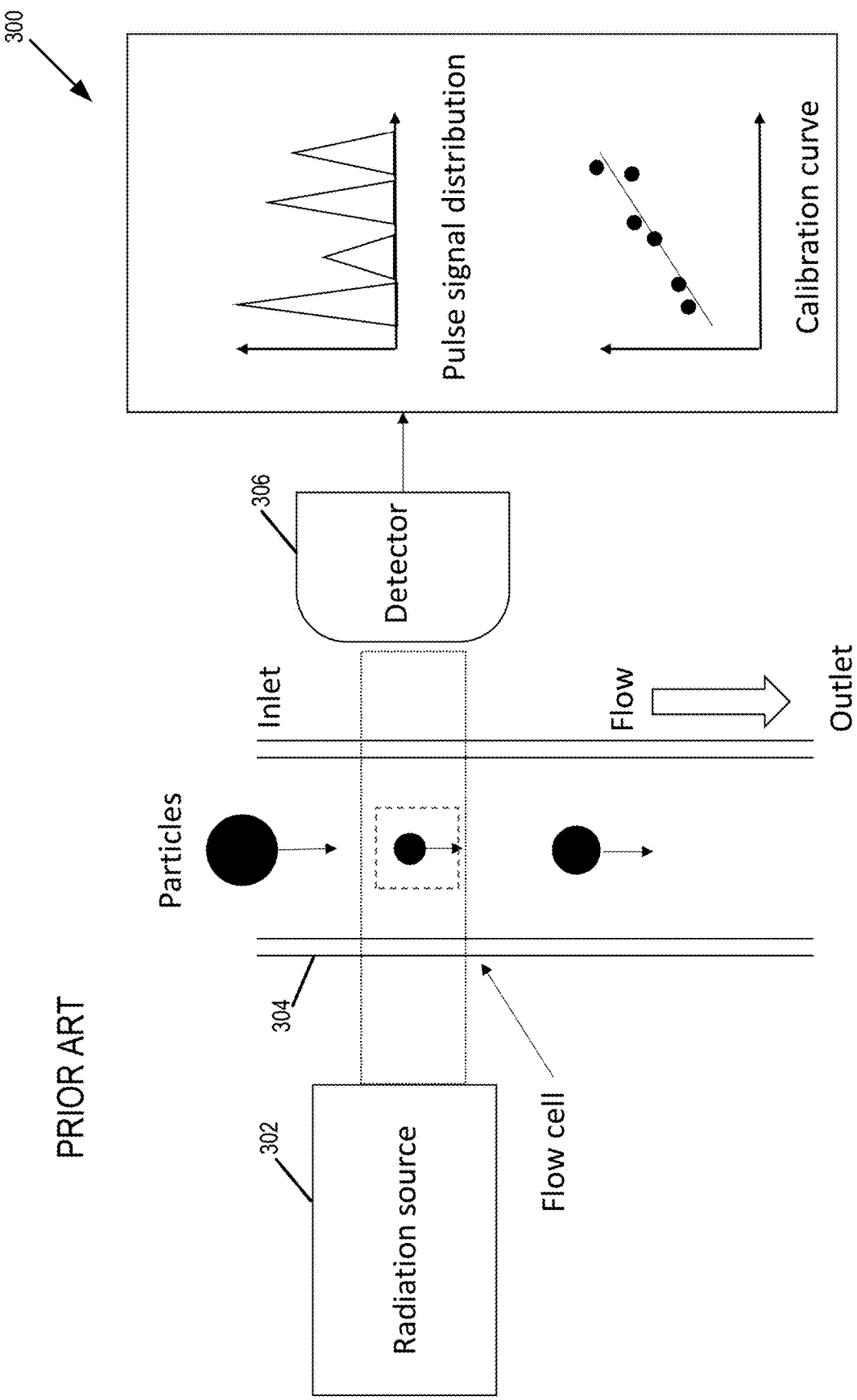
FIG. 3A illustrates a block diagram of an OPC sensor.

FIG. 3A illustrates a block diagram 300 of an OPC sensor. The OPC sensor is an example of a single particle measurement device in which particles are identified (e.g., counted) one at a time. As shown, a radiation source 302 (such as a laser diode) directs a light at chamber 304, with the detector 306 detecting the particles as a series of peaks (e.g., a pulse height distribution or pulse signal distribution) with the size of the peaks may be indicative of size of the respective particles. The laser may operate using power selected from the following range 0.1 mW to 100 mW (e.g., 5 mW). Further, various ranges of the laser are contemplated including extreme ultraviolet (UV), UV, visible, near infrared, and infrared.

The radiation source, such as the light source, may generate a continuous output. Alternatively, the radiation source may generate a pulsed output. Pulsing the radiation source may be performed for one or more reasons including: power savings; reduction of noise (e.g., pulse the light source at a sufficiently high frequency so that the noise and the particle signals are distinctly apart to separate the signals); or reduce heating of the radiation source; extend sensor lifetime. The selection of the frequency for pulsing may be based on a variety of factors including any one, any combination, or all of: size of the particle; size distribution; concentration; environmental conditions (e.g., temperature, humidity); or composition of particles. As merely one example, the concentration may determine the pulse frequency (e.g., higher concentrations result in selection of a higher pulse frequency versus lower concentrations result in selection of a lower pulse frequency). Further, in one or some embodiments, the selection of the pulse frequency may be static (e.g., the pulse frequency is constant throughout characterization of a specific aerosol) or may be dynamic (e.g., the pulse frequency is modified during the characterization of the specific aerosol). As one example of dynamic selection of the pulse frequency, the sensor may begin operation by selecting a default pulse frequency. After which, as one or more aspects of the aerosol are characterized (e.g., after determining an initial concentration), the pulse frequency may be modified (e.g., determining that the concentration is lower than typical, the pulse frequency is decreased; determining that the concentration is higher than typical, the pulse frequency is increased). Conversely, for a static pulse frequency, the sensor may be configured, such as for a certain concentration range. Responsive to the configuration of the certain concentration range, the static pulse frequency may be selected.

Thus, because the detector 306 senses on the order of nanoseconds, the detector 306 may detect the individual particles. In turn, from the pulse height distribution, the OPC sensor may compute the particle size, and then the number concentration. In practice, the respective pulses in the pulse height distribution may be sorted into different size bins (e.g., 0.3-0.5 nm in one size bin, 0.5-0.7 in a second size bin, etc.) based on the pulse heights of the respective pulses. In one implementation, when measuring the size distribution, size bins may be in the 200 nm to 20 micrometer range, with 6-256 size bins for sufficient detail. The size data from the size bins may be converted into size distribution data (e.g., for each time point, the y-axis is number concentration and the x-axis is the particle size). The number data for the respective bins may thus be termed the raw data. The size/number concentration is then converted into mass concentration, which is ultimately output by the OPC sensor.

Figure 3B:
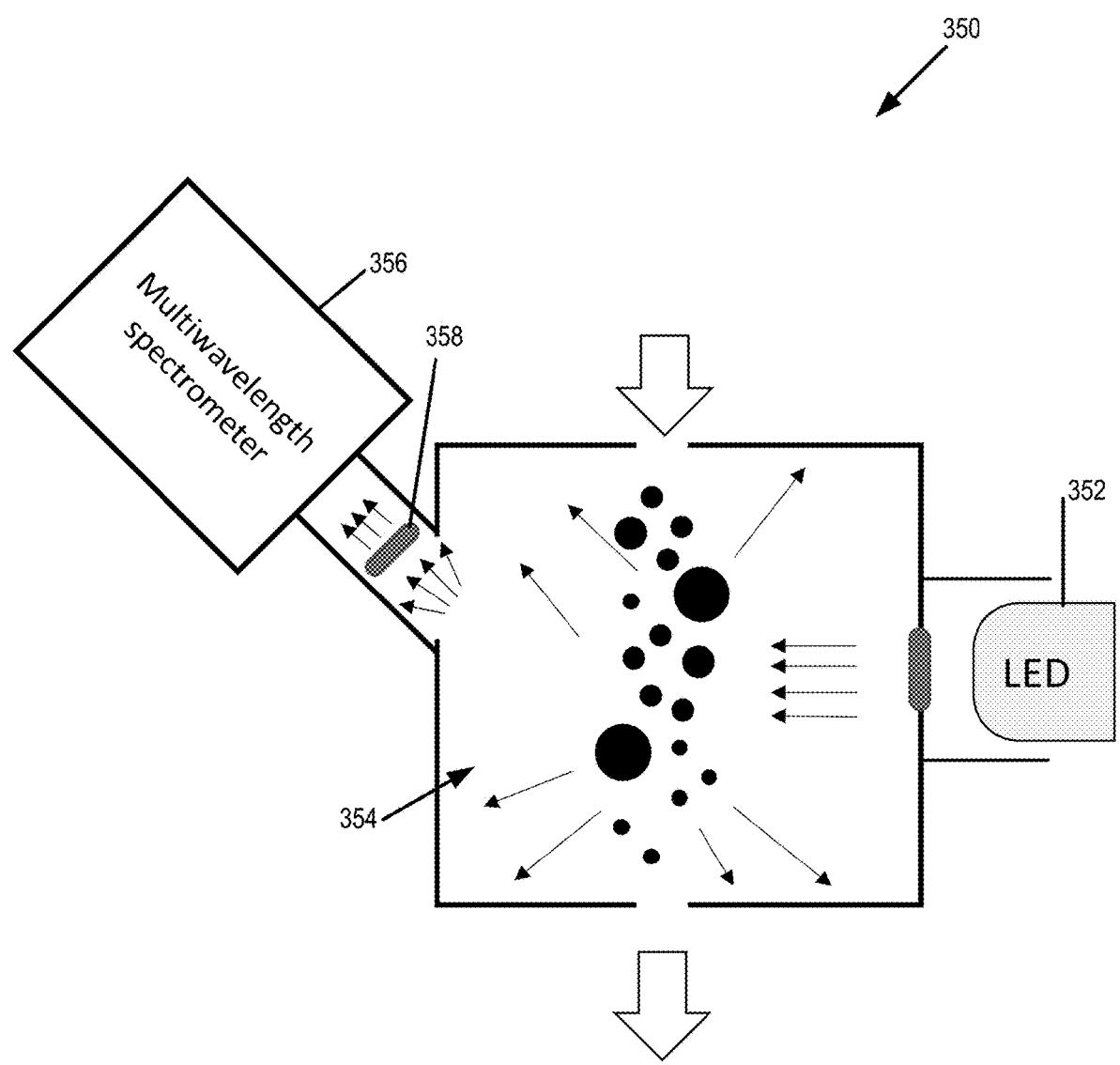
FIG. 3B illustrates a block diagram of a multiwavelength EPSM sensor.

FIG. 3B illustrates a block diagram 350 of a multiwavelength EPSM sensor. A multiwavelength EPSM sensor is one example of an ensemble sensor (which may sense multiple particle simultaneously). As shown, a white light LED 352 shines a light on a plurality of particles in a chamber 354, which scatters light that is sensed, such as via one or more lenses, by multiwavelength spectrometer 356, which may measure the scattered light at a plurality of wavelengths. Various spectrometers are contemplated. As merely one example, the Mini-spectrometer micro series C12666MA may be used. Other spectrometers are contemplated. Further, the particle counting functionality may be performed in a variety of ways including by using: laser-based single particle counting; aerodynamically-based single particle counting; or electrostatically-based (e.g., electrical mobility) single particle counting. In this regard, various devices to perform this functionality are contemplated including a scanning mobility particle sizer (SMPS) configured to measure the size distribution based on the electrical mobility of a particle, an aerodynamic particle sizer (APS) configured to use time-of-flight or aerodynamic drag to determine a particle's size distribution, a nanoparticle surface area monitor, configured to use charge to infer the surface area properties of aerosols, aerosol mass spectrometers configured to infer the chemical composition of aerosols; gravimetric filter analysis; Fourier-transfer infrared measurement (FTIR); Raman-spectroscopy based measurements; or thermo-gravimetric analysis (TGA).

Chamber 354 may be machined or injection-molded (with a metal, a plastic, or a composite). The interior of chamber 354 may be a black-absorbing finish to reduce background noise. Other ways to create chamber 354 are contemplated and other interiors are contemplated. Chamber 354 may be configured, designed, or shaped to reduce or minimize particle loss in diffusion to the walls of the chamber 354. For example, the output of the multiwavelength spectrometer 356 may comprise a signal, with the height of the signal indicative of the concentration of the particles. In contrast to the detector 306, the integration time of the multiwavelength spectrometer 356 is on the order of a few milliseconds, and thus cannot operate as fast as the detector 306. Other ensemble measurement devices are contemplated. For example, a multiangle EPSM sensor, which measures scattered particles at multiple angles, may likewise be used as an ensemble measurement device. As discussed further below, the OPC sensor (an example of which is illustrated in FIG. 3A) and the ensemble particle measurement sensor (an example of which is illustrated in FIG. 3B, which measures scattered light from a radiation source, such as a white light LED light source through a well-controlled flow). The ensemble measurement data (e.g., the scattering response from the LED light source from 300-800 nm wavelengths) in conjunction with the particle size distribution (based on the OPC sensor output) may be used determine the refractive index via advanced inversion algorithms, as discussed further below.

FIG. 3B illustrates that in one implementation a single light source and a single compact multiwavelength spectrometer is used (unlike previous ensemble measurement configurations that used a multielement photodiode detector or multiple single photodiode detectors). This simplified approach enables a low cost sensor which can provide size distribution and optical properties. For example, a CMOS image sensing design to detect multiple wavelengths may be used with a single element simultaneously, enabling a compact miniaturized design. Additionally, the aerosol sensor system may generate the full spectrum signal at multiple wavelengths as needed along with the particle size distribution data to determine the refractive index. The spectral response, which may be across a predetermined set of wavelengths or range of wavelengths, such as across 340 nm to 850 nm, may be measured in comparison with zero completely clean particle free air.

Further, the ensemble measurement sensor may include one or more lenses 358 between the detection zone in the chamber 354 and the multiwavelength spectrometer 356. For example, the ensemble measurement portion or sensor may include a lens arrangement one or both of the light source (in order to properly focus the white light onto the detection region) and the spectrometer (in order to focus the scattering signal) at a fixed distance. Knowledge of the detection region (e.g., the laser volume) may be used in the analysis.

Single particle measurements and ensemble measurements each have benefits and drawbacks in terms of sensing characteristics of aerosols. In one implementation, the data generated by each of the single particle measurements and ensemble measurements are analyzed in combination. This integrated or co-dependent analysis may result in reducing the drawbacks of the respective measurements and gleaning additional information (such as optical characterization), thereby improving the process of characterizing the aerosol.

Figure 4A:
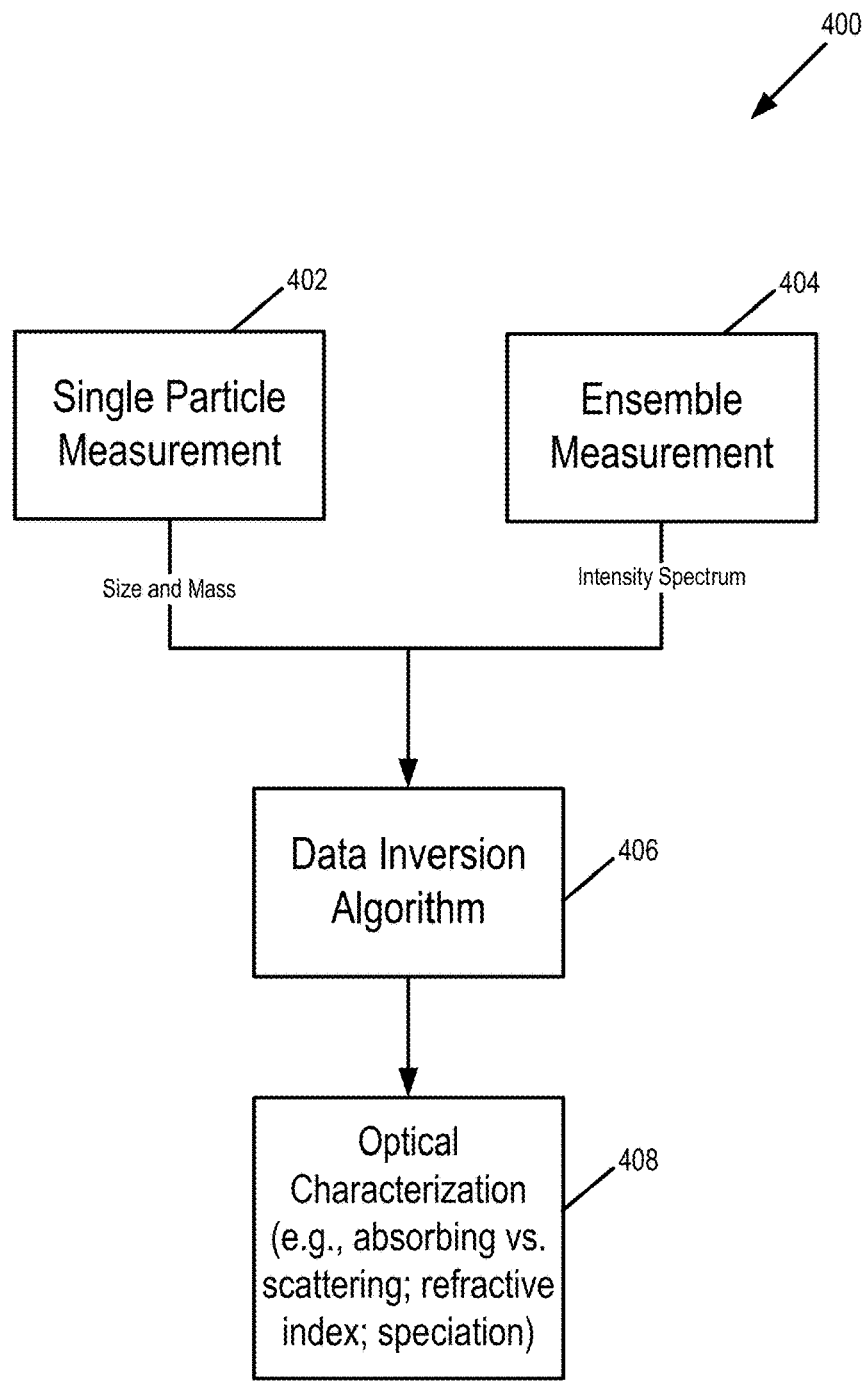
FIG. 4A illustrates a first flow diagram of generating outputs from a single particle measurement sensor and an ensemble measurement sensor, respectively, and analyzing the outputs in combination in order to characterize the aerosol.

FIG. 4A illustrates a first flow diagram 400 of generating outputs from a single particle measurement sensor and an ensemble measurement sensor, respectively, and analyzing the outputs in combination in order to characterize the aerosol. For example, single particle measurement 402 may output one or more types of data responsive to the single particle counting, such as size and mass of the particles, and ensemble measurement 404 may output one or more types of data responsive to the multiple particle analysis, such as intensity spectrum or angle measurements. Various ways to analyze, in combination, the data from the single particle and ensemble measurements are contemplated. For example, the respective data outputs may be input to data inversion algorithm 406. The output of the data inversion algorithm 406 may be used to characterize the aerosol, such as optical characterization 408 of the aerosol, as discussed further below.

Figure 4B:
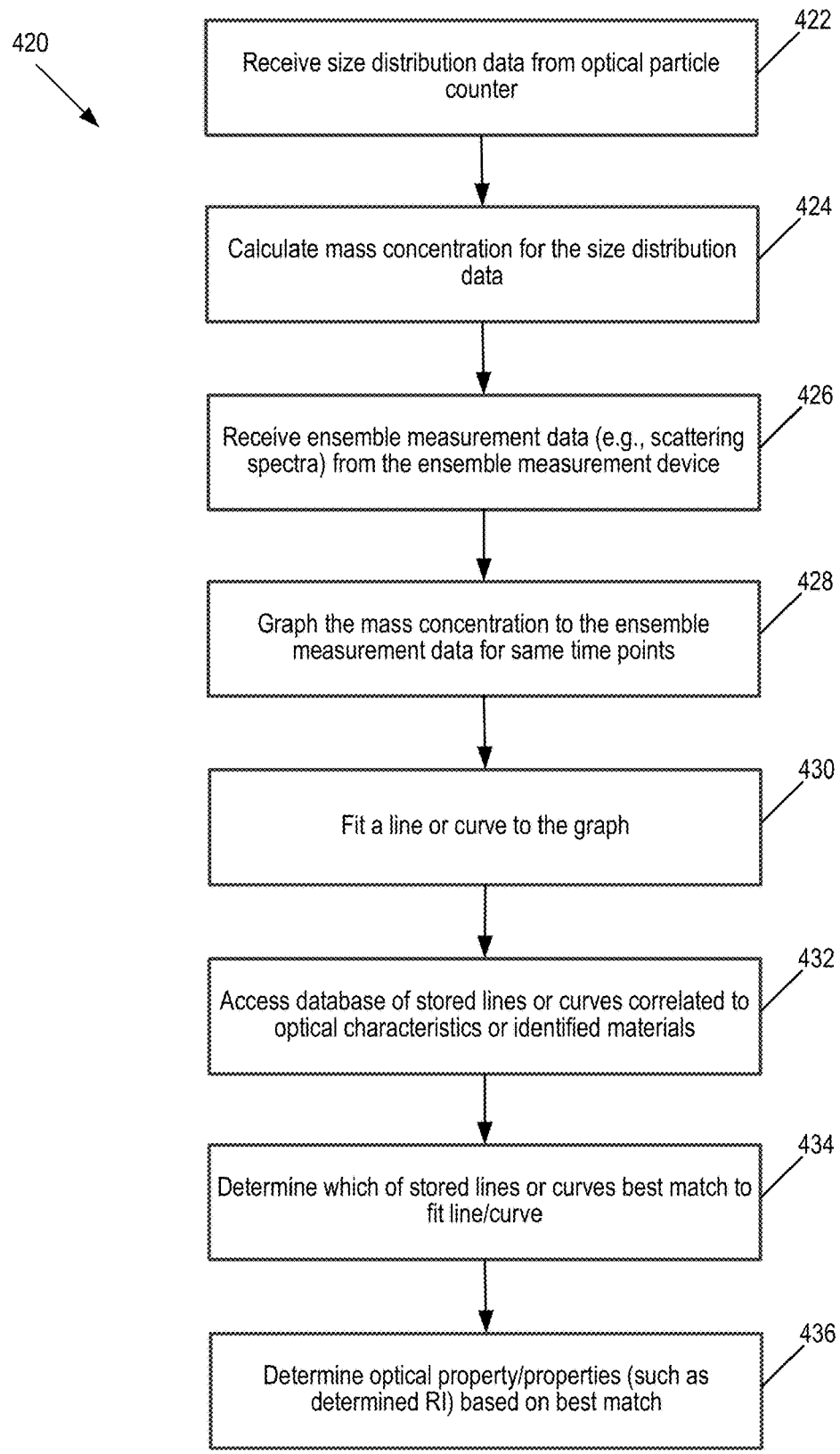
FIG. 4B illustrates a second flow diagram of generating outputs from a single particle measurement sensor and an ensemble measurement sensor, respectively, and analyzing the outputs in combination in order to characterize the aerosol.

FIG. 4B illustrates a second flow diagram 420 of generating outputs from a single particle measurement sensor and an ensemble measurement sensor, respectively, and analyzing the outputs in combination in order to characterize the aerosol. As discussed above, the OPC may output one or more types of OPC data. One type of OPC data comprises size distribution data. As discussed above, pulse data is sorted into size bins, which in turn is converted (using an assumed RI) into size distribution data. Some OPC sensors operate as a black box by simply outputting the size distribution data (without providing access to the pulse data or the size bin data.

Figure 4C:
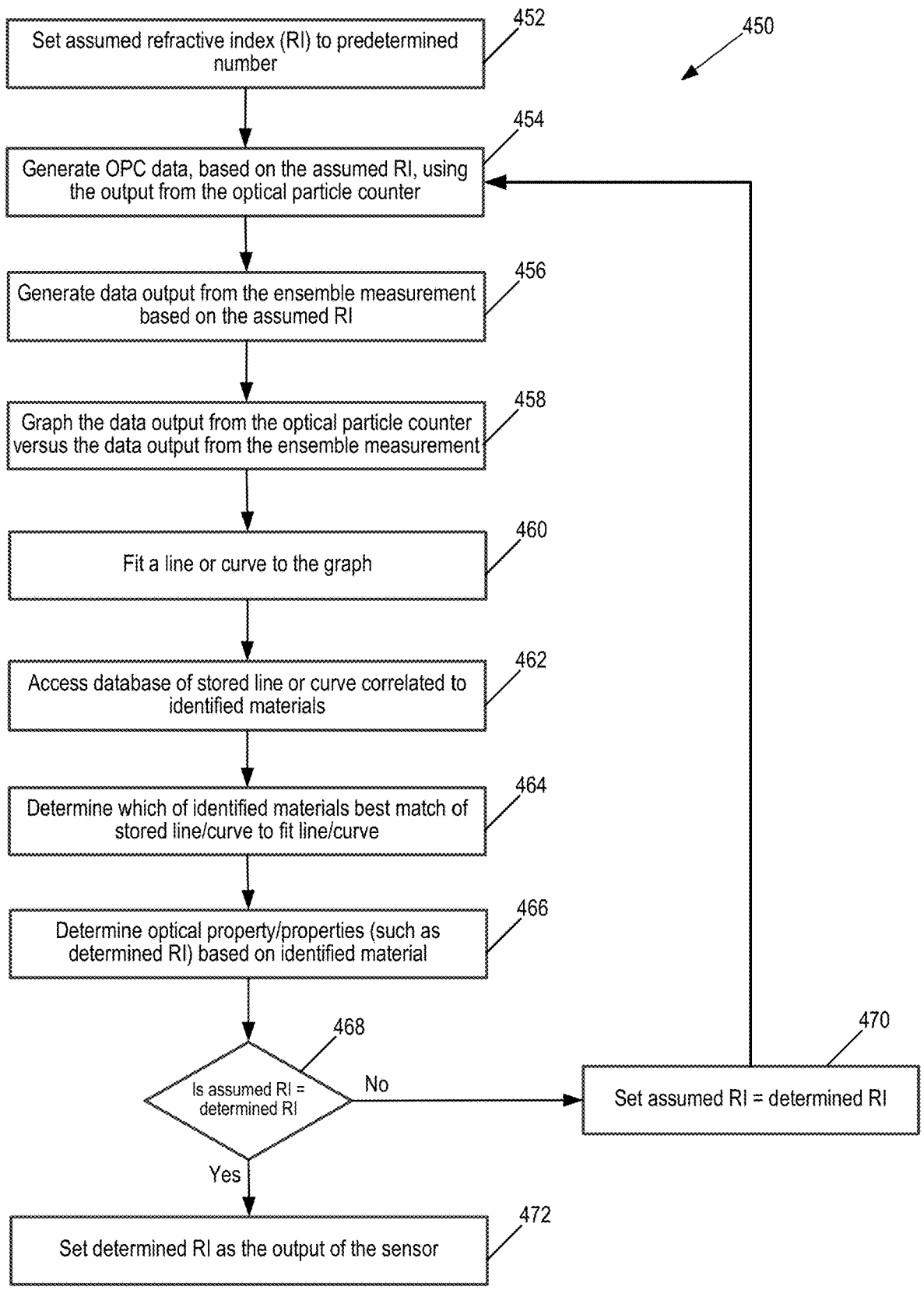
FIG. 4C illustrates a third flow diagram of generating outputs from a single particle measurement sensor and an ensemble measurement sensor, respectively, and iteratively analyzing the outputs in combination in order to characterize the aerosol.

At 422, the size distribution data is received from optical particle counter. At 424, the mass concentration for the size distribution data is calculated. At 426, the ensemble measurement data (e.g., scattering spectra) is received from the ensemble measurement device. Though FIGS. 4B-C illustrate the optical particle counter outputting data before the ensemble measurement, the converse may be true. Alternatively, the data may be output simultaneously.

Figure 5A:
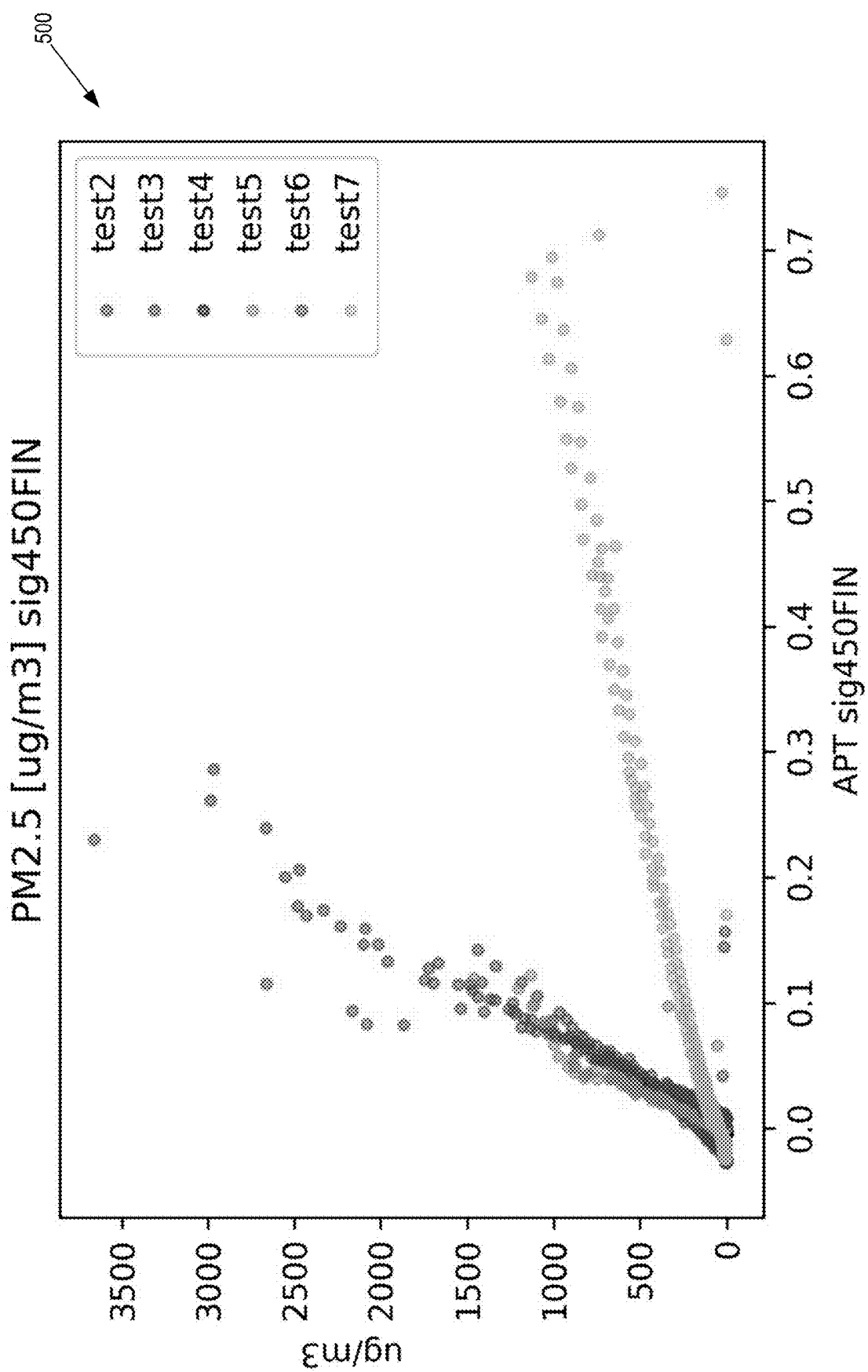
FIG. 5A illustrates a first graph of mass concentration measured from an OPC sensor versus relative intensity at one scattering wavelength from the spectrometer for a plurality of materials.
Figure 5B:
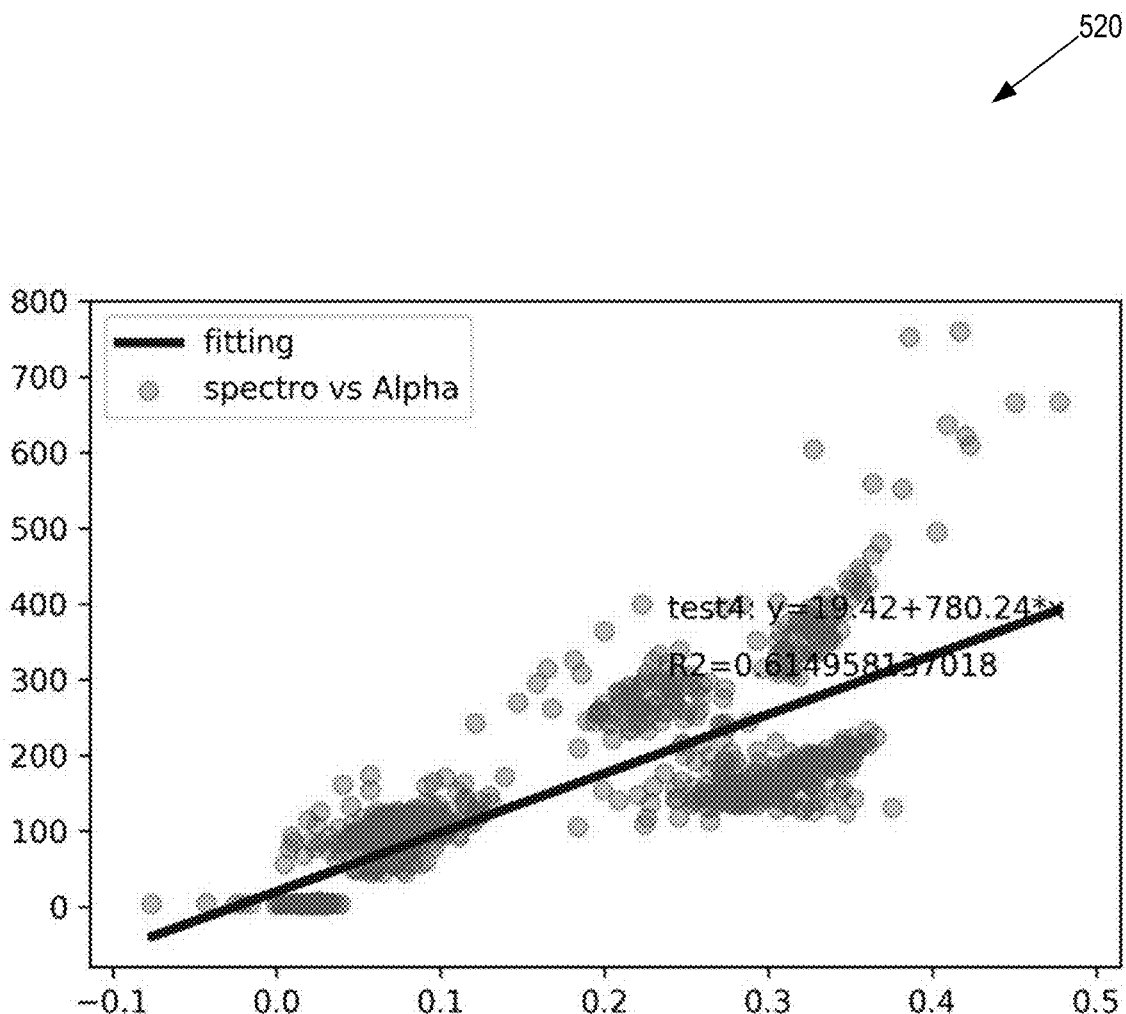
FIG. 5B illustrates a second graph (and a line fit) of mass concentration measured from an OPC sensor versus relative intensity at one scattering wavelength from the spectrometer for a first material.
Figure 5C:
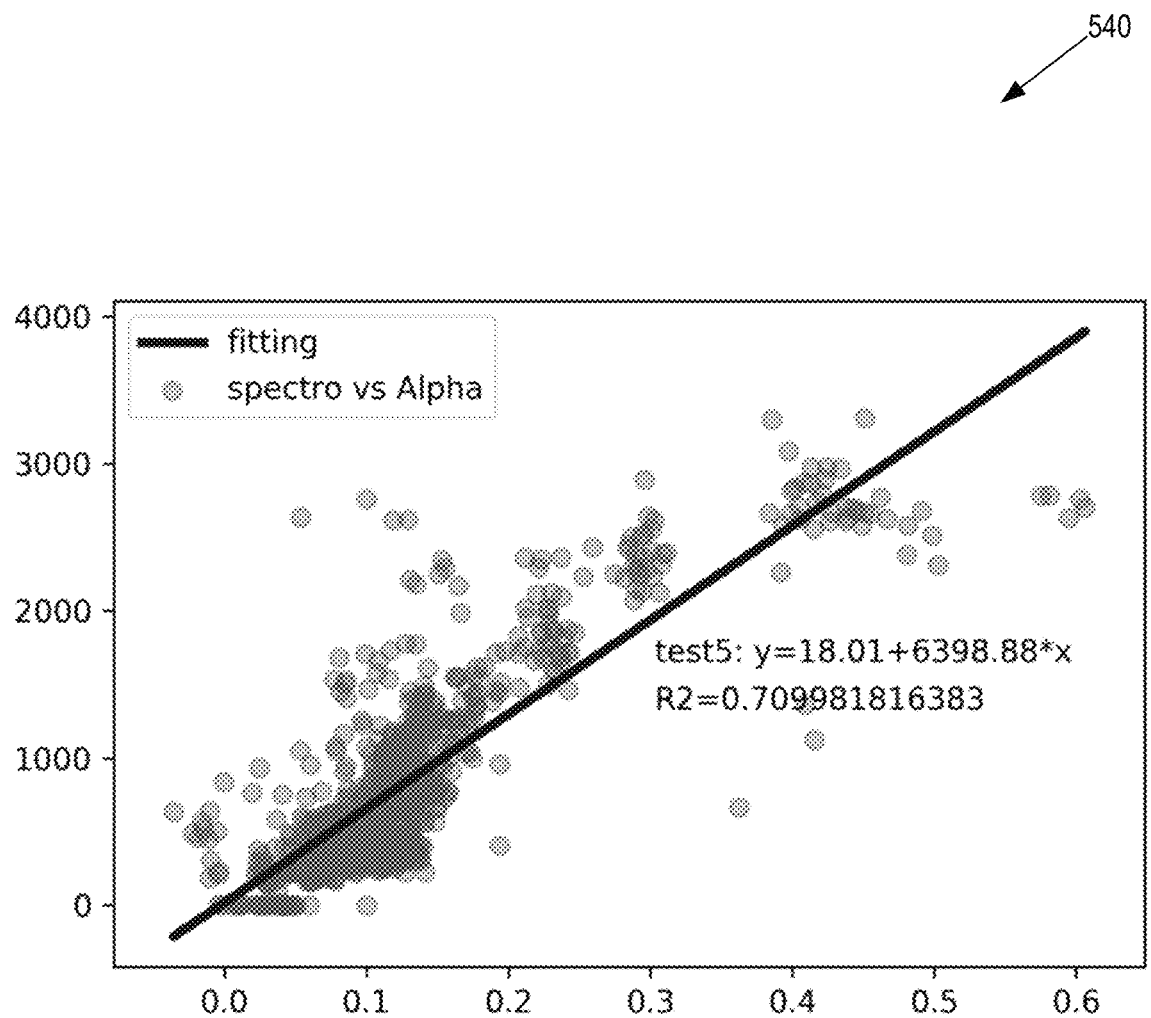
FIG. 5C illustrates a third graph (and a line fit) of mass concentration measured from an OPC sensor versus relative intensity at the same scattering wavelength as in FIG. 5B from the spectrometer for a second material.

A correlation of the ensemble measurement data and the OPC data may be identified. As discussed above, various correlations are contemplated, such as illustrated in blocks 428 and 430. Specifically, at 428, the mass concentration and the ensemble measurement data for same time points (e.g., data point for t=0.1 sec with relative intensity at a wavelength for time=0.1 sec as the x ordinate and the mass concentration for time=0.1 sec as the y ordinate) are graphed relative to one another. Examples of this are illustrated in FIGS. 5A-C. At 430, a line or curve is fit to the graphed data points, such as illustrated in FIGS. 5B-C. Alternatively, the output of the spectrometer and the output of the optical particle counter may be plotted on the y-axis and x-axis, respectively. Further, graphs may be generated for each of a multitude of wavelengths as output by the spectrometer (with lines fit to each of the graphs). Alternatively, in the instance of a multiangle EPSM sensor (where the angles may be over a certain range, such as 60°-150°, and the data integrated over the certain range), the graphs may be generated for each angle. Thus, a single graph (e.g., for a single wavelength or a single angle) and a respective line fit, or multiple graphs (e.g., for multiple wavelengths or multiple angles) and multiple respective line fits may be generated. Other graphs as well as other mathematical relationships of the data output from the optical particle counter and the ensemble measurement device are contemplated.

At 432, a database of stored lines or curves correlated to optical characteristics or identified materials is accessed. As one example, different materials, such as sodium chloride, stainless steel, road dust, black carbon, or the like have different respective absorption/scattering properties, which may be manifested in lines or curves for a respective wavelength or angle. As another example, different characteristics, such as absorbing (e.g., strongly absorbing) or scattering (e.g., strongly scattering) may have lines or curves for a respective wavelength or angle.

At 434, the best match of the fit line/curve to one of the stored lines or curves is determined. For example, the line or curve fit to the data on the graph of the unknown material may be compared with one, some, or all of the lines/curves in the database for a best match. At 436, the methodology may determine one or more optical properties (such as RI) of the aerosol based on the best match. In this regard, FIG. 4B illustrates one example of calibration-based approach using OPC number concentration.

For example, the line fit to the graph may be closest to sodium chloride (e.g., such as based on $R^2$ in a linear regression). As such, the methodology may determine that the material in the aerosol is (or is most similar to) sodium chloride and may ascribe optical properties of the aerosol as one or more properties of sodium chloride.

Various types of properties (such as optical properties) may be ascribed to the aerosol. In one implementation, a general optical property, such as whether the material is absorbing (e.g., lightly absorbing, strongly absorbing, etc.), scattering (e.g., lightly scattering, strongly scattering, etc.), may be determined. Alternatively, or in addition, a specific optical property, such as a value for the RI, may be determined.

In this regard, the ascribing of the properties may be performed in one of several ways. In one way, the aerosol may be identified as a certain material (e.g., the fit line is closest to the line associated with a metal), and the optical properties of the certain material may then be ascribed to the aerosol. For example, if the fit line best matches to a line in the database associated with a metal, the methodology may determine that the general optical property is strongly absorbed (e.g., correlated to the "metal" entry in the database is "strongly absorbed" since metals exhibit this general optical characteristic). In another way, the methodology may identify general optical properties, and then may determine the general category of the material. For example, the optical characterization/properties of the aerosol may indicate the composition of the aerosol (e.g., determining whether the aerosol is carbon-based or inorganic-based (which can thus ascribe the aerosol to different types of pollution, such as vehicle pollution versus industrial pollution)).

In one implementation, a single graph of the data (and an associated line/curve fit to the data) may be generated in order to compare to the database of known lines/curves. For example, a single graph of the data at 450 nm (and an associated line fit to the data) may be generated. This fit line may then be compared to the database of known lines at 450 nm. Alternatively, multiple graphs of the data (and associated lines/curves fit to the data) may be generated in order to compare to the database of known lines/curves. For example, a first graph of the data may be generated at 450 nm (and associated line fit) and a second graph of data at 550 nm (and associated line fit) may be generated. The fit line at 450 nm may be compared with the database of lines of known materials at 450 nm, and fit line at 550 nm may be compared with the database of lines of known materials at 550 nm in order to determine the material with the best match (e.g., matching two separate fit lines to identify the material closest to that in the aerosol), thereby potentially increasing the accuracy of the matching algorithm versus using a single fit line to match. In this regard, a single graph or multiple graphs (such as at least 3 graphs for 3 different wavelengths or angles, at least 4 graphs for 4 different wavelengths or angles, at least 10 graphs for 10 different wavelengths or angles, etc.) may be generated in order to find the best match.

FIG. 4C illustrates a third flow diagram 450 of generating outputs from a single particle measurement sensor and an ensemble measurement sensor, respectively, and iteratively analyzing the outputs in combination in order to characterize the aerosol. As discussed above, one or both of the optical particle counter or the ensemble measurement device may operate using an assumed refractive index (RI), or other assumed parameters. Thus, at 452, the assumed RI is set to a predetermined number. At 454, the processing functionality generates OPC data, based on the assumed RI, using the output from the optical particle counter. As discussed above, various types of OPC data are contemplated. One type comprises pulse height measurement, which may be output by the OPC sensor. Prior to analyzing the OPC data in combination with the ensemble measurement data, the OPC data may be modified, such as performing data inversion from the OPC pulse height measurement using the assumed refractive index in order to generate the size distribution data (e.g., size-based number concentration), which may in turn be used to generate the mass concentration. At 456, the ensemble measurement likewise output data (such as the intensity spectrum) based on the assumed RI. As discussed above, the order in which the data is received by the processing functionality (such as processing functionality 116) may vary. The data may be time stamped, thereby enabling the processing functionality to determine the time points when the data associated with the data.

At 458, a graph (or other mathematical construct) may be generated based on the OPC data and the ensemble measurement data. As discussed above, the graph may be generated based on the data received from the respective sensors; alternatively, the data may be modified. As one example, the graph may comprise the mass concentration (measured based on OPC data generated by the optical particle counter) on the y-axis versus the relative intensity (at one scattering wavelength from the spectrometer) on the x-axis, such as illustrated in FIGS. 5A-C, discussed further below.

At 460, a line or curve may be fit to the graph. As discussed above, a single graph (such as at a single wavelength or a single angle) or multiple graphs (such as at multiple wavelengths or multiple angles) may be generated. Similar to 432, 434, and 436, at 462, a database of stored lines or curves correlated to optical characteristics or identified materials is accessed, at 464, the best match of the fit line/curve to one of the stored lines or curves is determined, and at 466, one or more optical properties (such as RI) of the aerosol are determined based on the best match to the identified material.

As illustrated in FIG. 4C, flow diagram 450 iterates until the assumed RI is equal to (or within a predetermined amount of) the determined RI. Thereafter, the determined RI is compared to the assumed RI. For example, at 468, it is determined whether the assumed RI is equal to (or within a margin of error from) the determined RI. If so, then the determined RI is found to be correct, and at 472, the determined RI is set as the output for the sensor. If not, the methodology iterates again. If not, at 470, the assumed RI is set equal to the determined RI and blocks 454-468 are repeated. Again, this process may continue until the assumed RI (or other type of optical property) is within a certain margin of error from the determined RI. For example, the assumed RI may initially be set to 1.5. The determined RI in the first iteration may equal 2.2. Thus, the methodology will iterate until the assumed RI and the determined RI converge. In this regard, FIG. 4C illustrates an example of a data inversion-based approach using OPC raw data.

FIG. 5A illustrates a first graph 500 of mass concentration measured from an OPC sensor versus relative intensity at one scattering wavelength from the spectrometer for a plurality of materials. As discussed above, the database may include data from previous tests of materials. The data may be based on the measurements themselves (such as the graph of the measurements or a graph of data generated from the measurements) and/or may comprise a line or curve fit to the graph. The data in the database may then be used to compare with the graphs generated, as discussed above. Example materials include: test 2: Arizona road dust; tests 3-4: combustion aerosol of different sizes (e.g., brown carbon, black carbon); test 5: incense; test 6: stainless steel; test 7: sodium chloride. Other materials (e.g., smoke) are contemplated. As shown, the data indicates that different lines may be fit to the data. In this regard, data from OPC and ensemble measurement of unknown aerosols may be graphed, and compared to the test data in order to identify the aerosol and/or its optical properties. Thus, accurate calibration may be performed based on multiple different aerosol sources. For example, reference aerosols may be tested under various concentrations, and the resulting size distribution, mass, and light scattering spectrum may be captured for calibration (and stored in the database) to allow for in-situ determination of optical properties for airborne particulates.

FIG. 5B illustrates a second graph (and a line fit) 520 of mass concentration measured from an OPC sensor versus relative intensity at one scattering wavelength (450 nm) from the spectrometer for a first material. FIG. 5C illustrates a third graph (and a line fit) of mass concentration measured from an OPC sensor versus relative intensity at the same scattering wavelength (450 nm) as in FIG. 5B from the spectrometer for a second material. As shown, the line fit to the graphed data in FIG. 5B is different from the line fit to the graphed data in third graph 540 in FIG. 5C. Alternatively, the response of the multiwavelength sensor at the different wavelength and the response of the OPC (either size distribution or the pulse height) may be fed it into a machine-learning model in to determine the material of the aerosol.

Figure 6A:
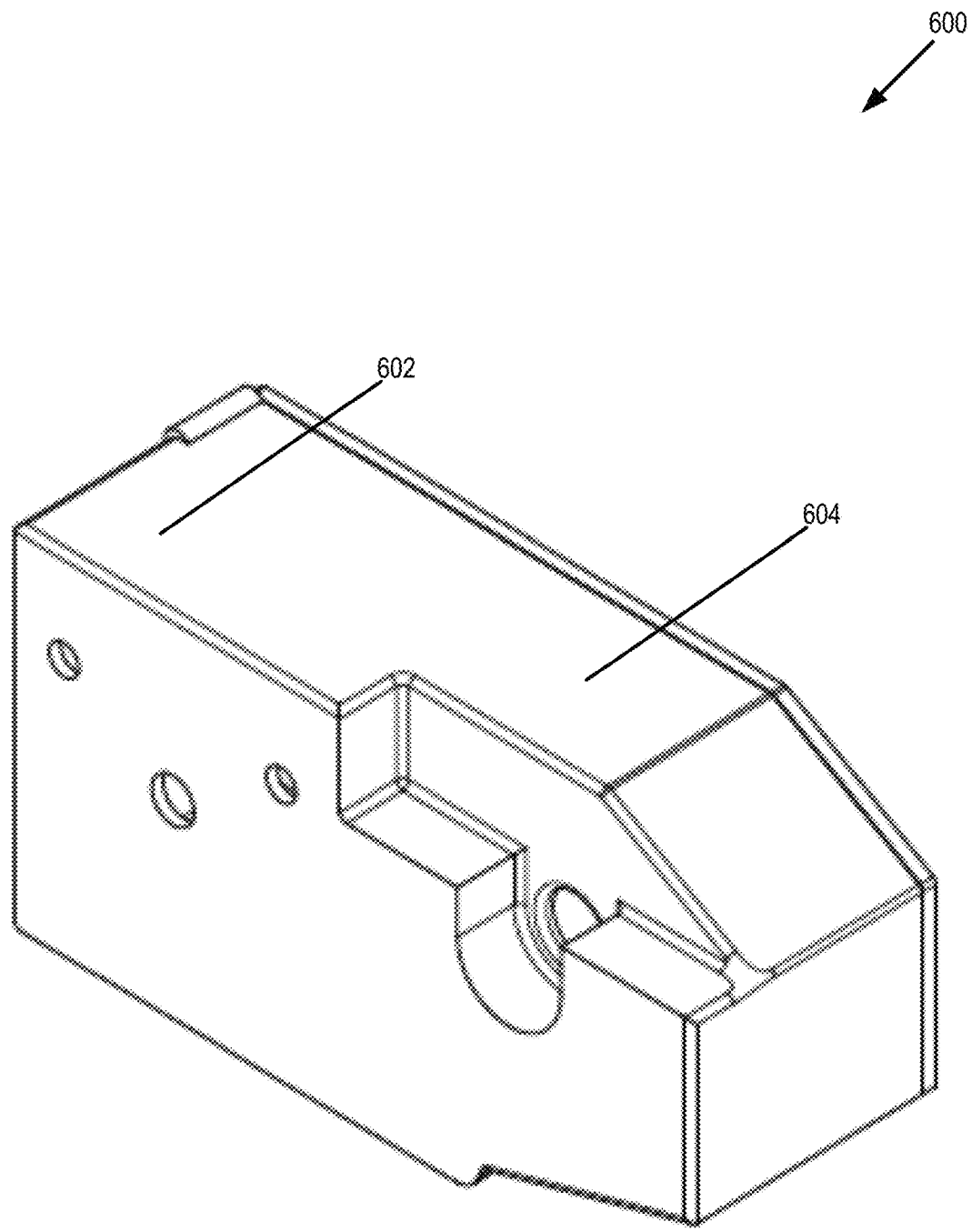
FIG. 6A illustrates the housing of an aerosol sensor with different inlets for the OPC and for the multiwavelength aerosol spectrometer.

FIG. 6A illustrates the housing 600 of an aerosol sensor with different inlets for the OPC and for the multiwavelength aerosol spectrometer. Housing 600 includes optical particle counter inlet 602, and ensemble measurement inlet 604. Other configurations are contemplated, including those disclosed in FIGS. 2A-C.

Figure 6B:
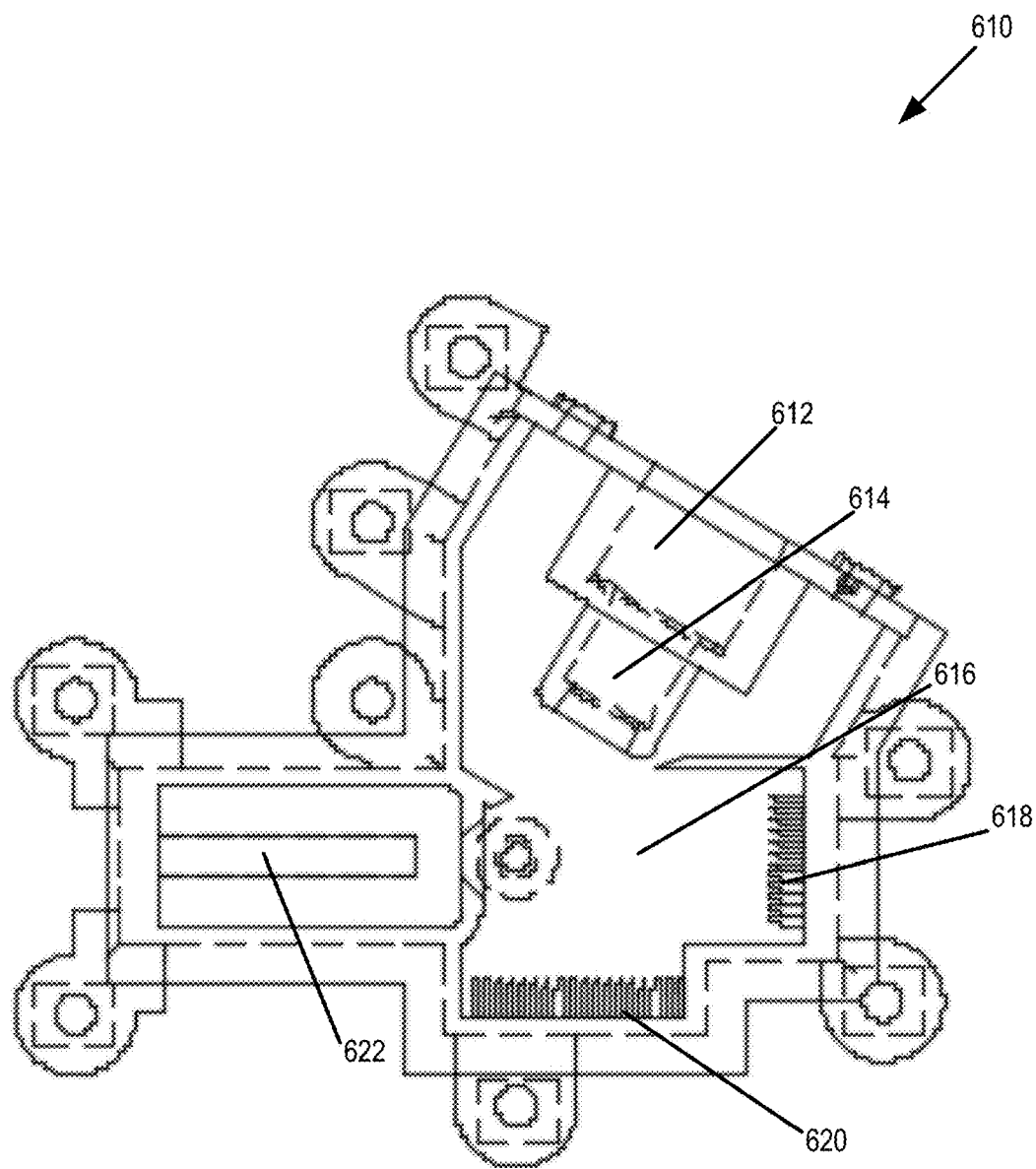
FIG. 6B illustrates a schematic of an interior of the aerosol sensor.

FIG. 6B illustrates a schematic 610 of an interior of the aerosol sensor. FIG. 6B includes a light source/lens arrangement 622 (which manipulates the light from the emission source to optimize the scattering signal), an aerosol inlet 616, light traps 618, 620 (which prevents fugitive scattering), lens(es) 614 (which manipulates or focuses scattered signal towards the multiwavelength spectrometer element 612), and multiwavelength spectrometer element 612. Other configurations are contemplated.

Figure 6C:
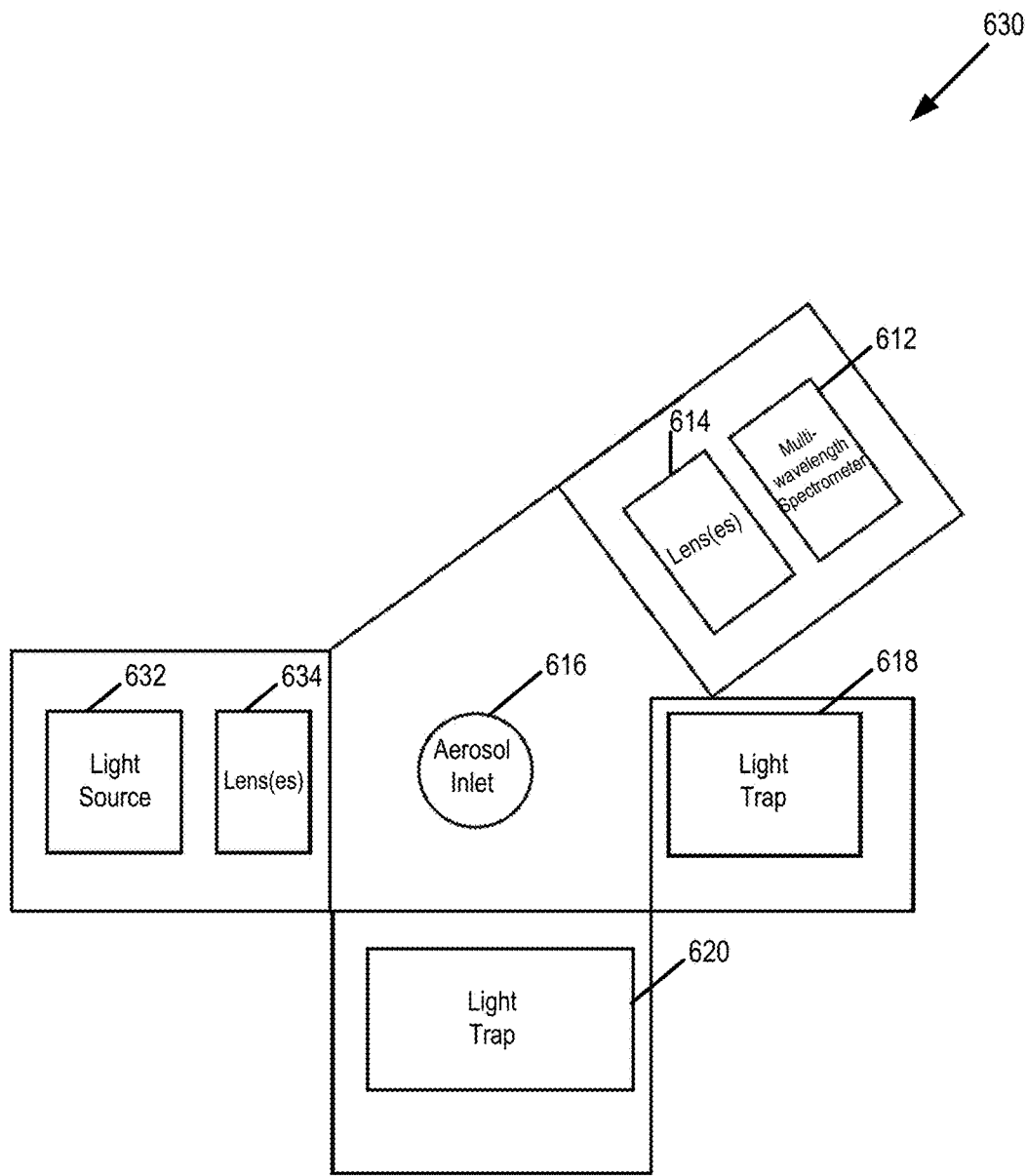
FIG. 6C illustrates a first block diagram of an interior of the aerosol sensor.

FIG. 6C illustrates a first block diagram 630 of an interior of the aerosol sensor depicting light source 632, lens(es) 634, aerosol inlet 616, light traps 618, 620, lens(es) 614, and multiwavelength spectrometer element 612

Figure 7A:
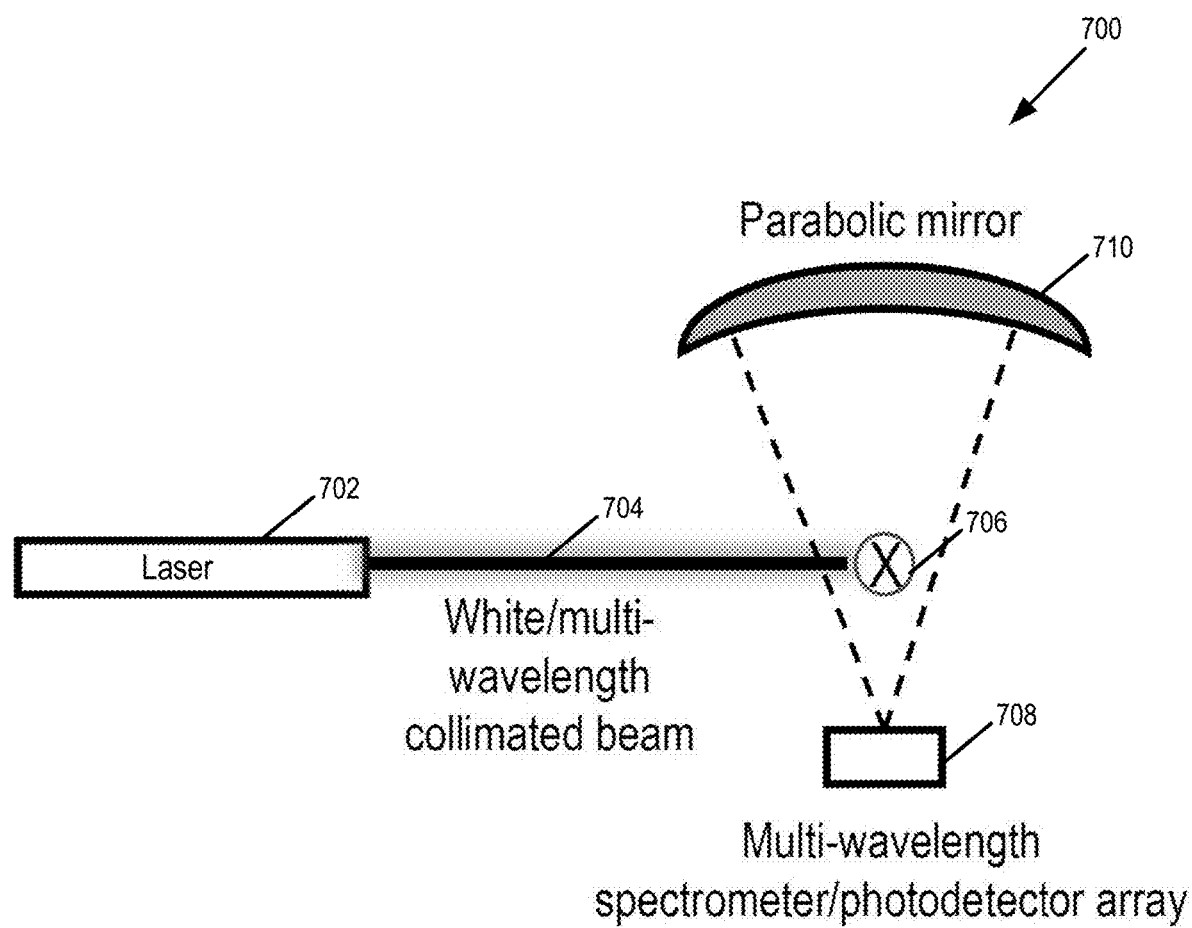
FIG. 7A illustrates a first example of a multiwavelength single particle counter.

FIG. 7A illustrates a first example of a multiwavelength single particle counter 700. As discussed above, different chambers may be used to generate data for the respective optical particle measurements and ensemble measurements. In that regard, even though the timing of the data measurements may be synced, the particles measured in the different chambers are different. In contrast, a single chamber may be used in order to generate data for particle counting and wavelength or angle in combination. As shown, laser 702 generates a white or multiwavelength collimated beam 704 onto an area 706. A parabolic mirror 710 may focus the scattered light onto the multiwavelength spectrometer/photodetector array 708. The multiwavelength spectrometer/photodetector array 708 may operate with a sufficient response time (e.g., on the order of nanoseconds) in order to obtain readings for each particle that passes.

The particle counting measurements and the wavelength or angle measurements may then be used to characterize the aerosol, such as identify the aerosol, identify one or more optical characteristics (e.g., identify the RI of the aerosol, etc.). In one implementation, the single particle counting is performed at multiple wavelengths (e.g., 30 wavelengths) or multiple angles (e.g., 5 angles). For every particle, n wavelengths (such as 30 wavelengths) will produce n different scattering intensities (such as 30 different scattering intensities). There are a variety of ways in which to process this information including any one of the following: (1) determine scattering intensity ratios at different wavelength in order to determine material based on previous such measurements; (2) use assumed RI to calculate size for this individual particle at each wavelength and then iterate until size of the particle derived from different wavelengths/angles is within a predetermined margin (e.g., an iterative approach); (3) feed the n responses (the 30 responses) into a trained machine-learning model (e.g., a neural network) that is configured to output the size and RI of the particle; or (4) the Mie scattering equations can be rigorously solved to obtain the exact solution.

Thus, the configuration illustrated in FIG. 7A uses a single light source and a single spectrometer. Apart from using a single light source, the multiwavelength or multiangle optical particle counting may also use multiple light sources and photodetectors. Further, using the optical and size parameters obtained, the constituents in the aerosol may be identified and optionally lead to source identification. Finally, although FIG. 7A illustrates a multiwavelength spectrometer/photodetector array, data to collect particle counting and wavelength or angle may be performed for a single wavelength or single angle, or for multiple wavelengths and multiple angles.

Figure 7B:
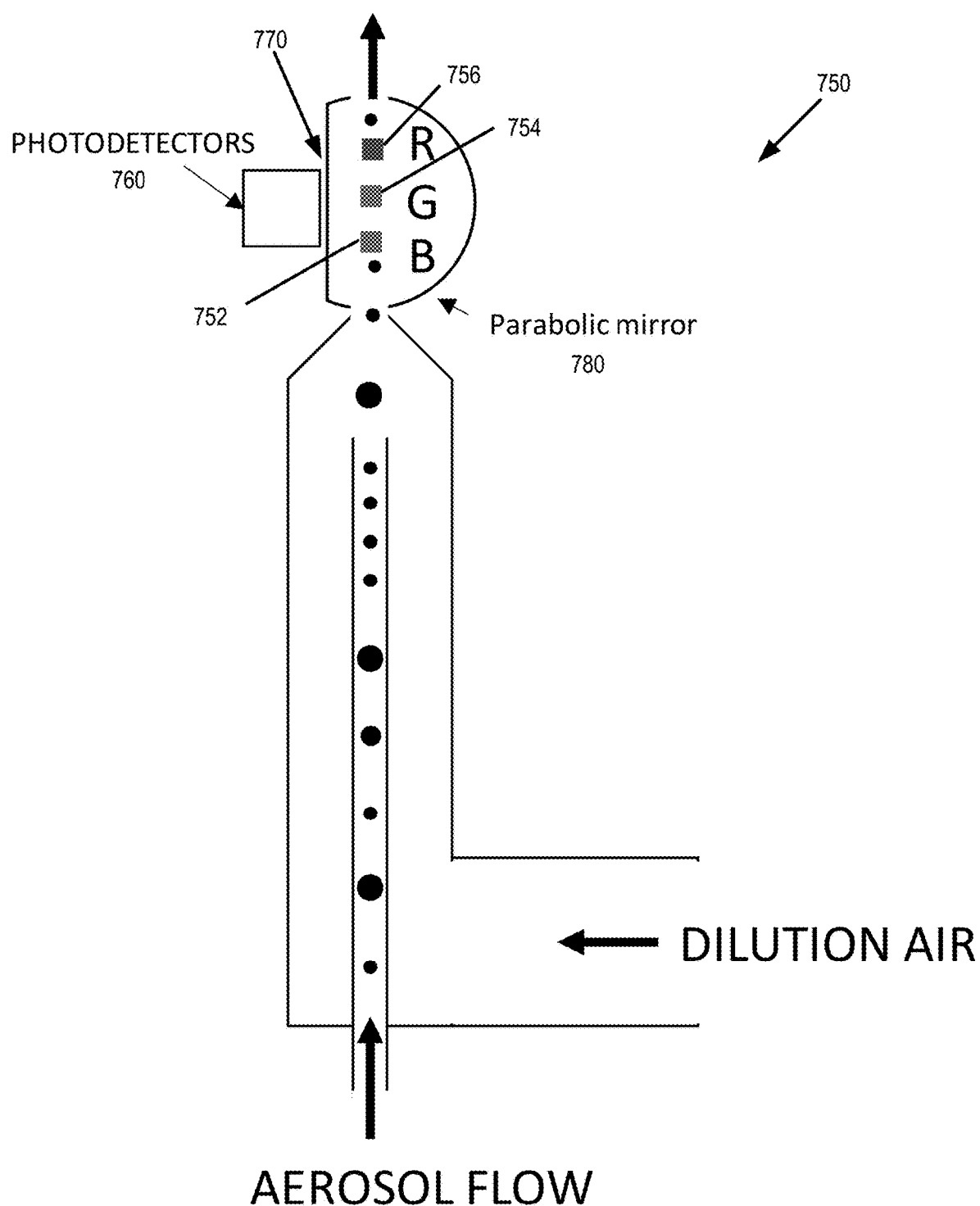
FIG. 7B illustrates a second example of a multiwavelength single particle counter.

FIG. 7B illustrates a second example of a multiwavelength single particle counter 750, which uses lasers of discrete wavelength (or narrow wavelength range), such as blue laser 752, green laser 754, and red laser 756, and which uses photodetectors 760, and a mirror (such as a parabolic mirror 780). The aerosol may flow to the region 770 in order for the light to shine on the single particle as it travels past the red laser 756 (to generate scattering on photodetectors 760), then past the green laser 754 (to generate scattering on photodetectors 760), and finally past the blue laser 752 (to generate scattering on photodetectors 760).

In this way, multiwavelength single particle counter 700, 750 integrates both the particle counting and the multiwavelength measurements. In particular, optical particle counter functionality and multiwavelength functionality are combined using a single well-collimated white light source (such as a white laser or lens arrangement as illustrated in FIG. 7A) or multi-wavelength collimated lasers (as illustrated in FIG. 7B). The method uses one spectrometer (see FIG. 7A) or photodetector(s) (as illustrated in FIG. 7B). The configurations illustrated in FIGS. 7A-B generates OPC data (e.g., a pulse height distribution) at every wavelength for each single particle. Further, the analysis of the data generated results in one or both of an accurate size distribution and refractive index for each individual aerosol particle. Thus, FIGS. 7A-B illustrate multi-wavelength optical particle counting.

Figure 8A:
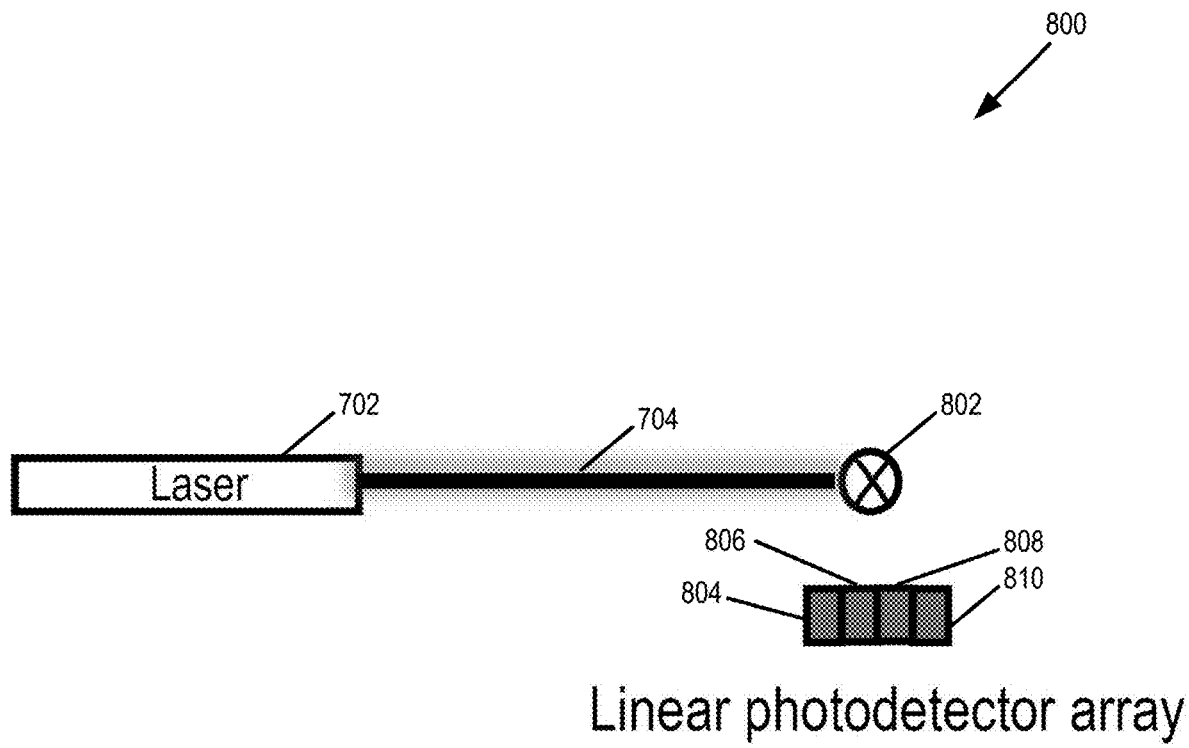
FIG. 8A illustrates a first example of a multiangle single particle counter.
Figure 8B:
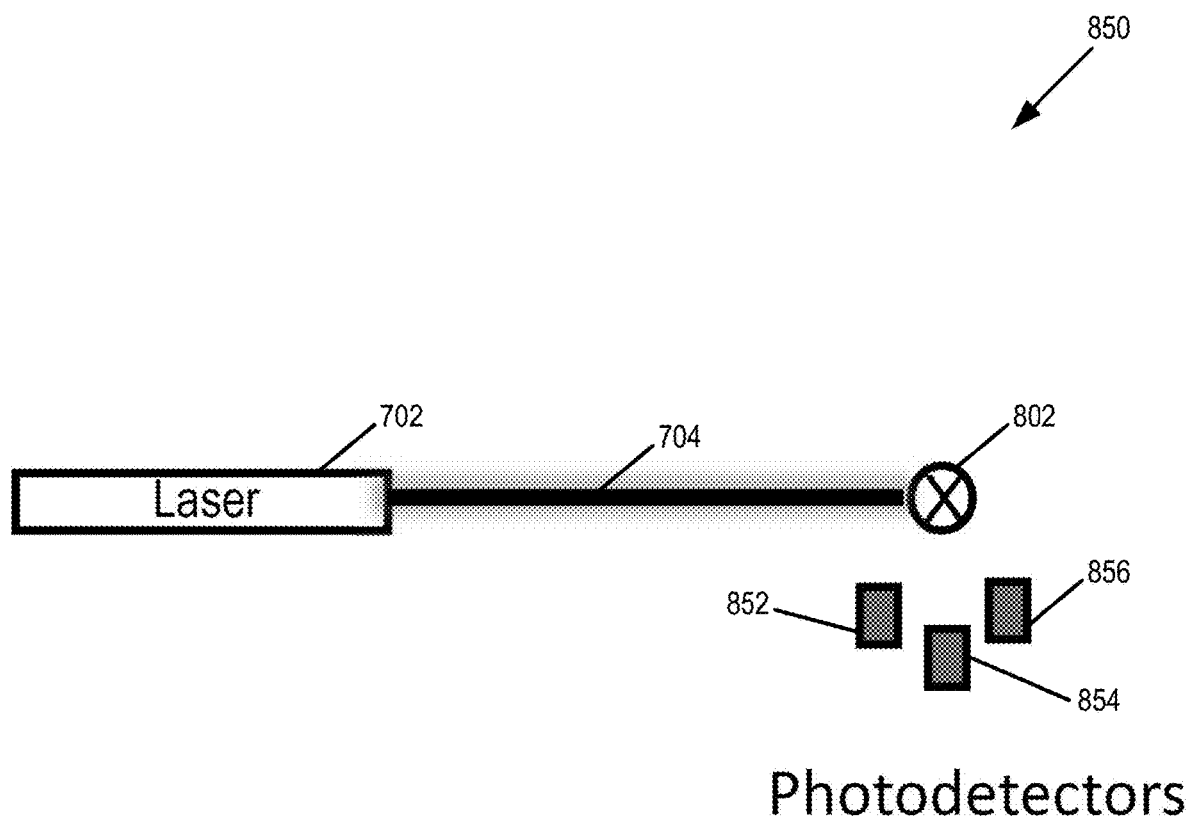
FIG. 8B illustrates a second example of a multiangle single particle counter.

FIG. 8A illustrates a first example of a multiangle single particle counter 800. As shown, laser 702 generates a white or multiwavelength collimated beam 704 onto an area 802, with linear photodetector array 804, 806, 808, and 810 sensing the response as a particle is at area 802. As one example, the linear photodetector array may comprise multi-pixel photon counters (MPPC). Further, the linear photodetector array may comprise a linear photodetector array, which may be 1-dimensional or 2-dimensional. FIG. 8B illustrates a second example of a multiangle single particle counter 850 in which a different photodetector is used. Specifically, individual photodetectors 852, 854, 856 are used to sense the scattering response at multiple angles (e.g., spacing different individual photodetectors at different angles on a surface of a sphere).

Figure 9:
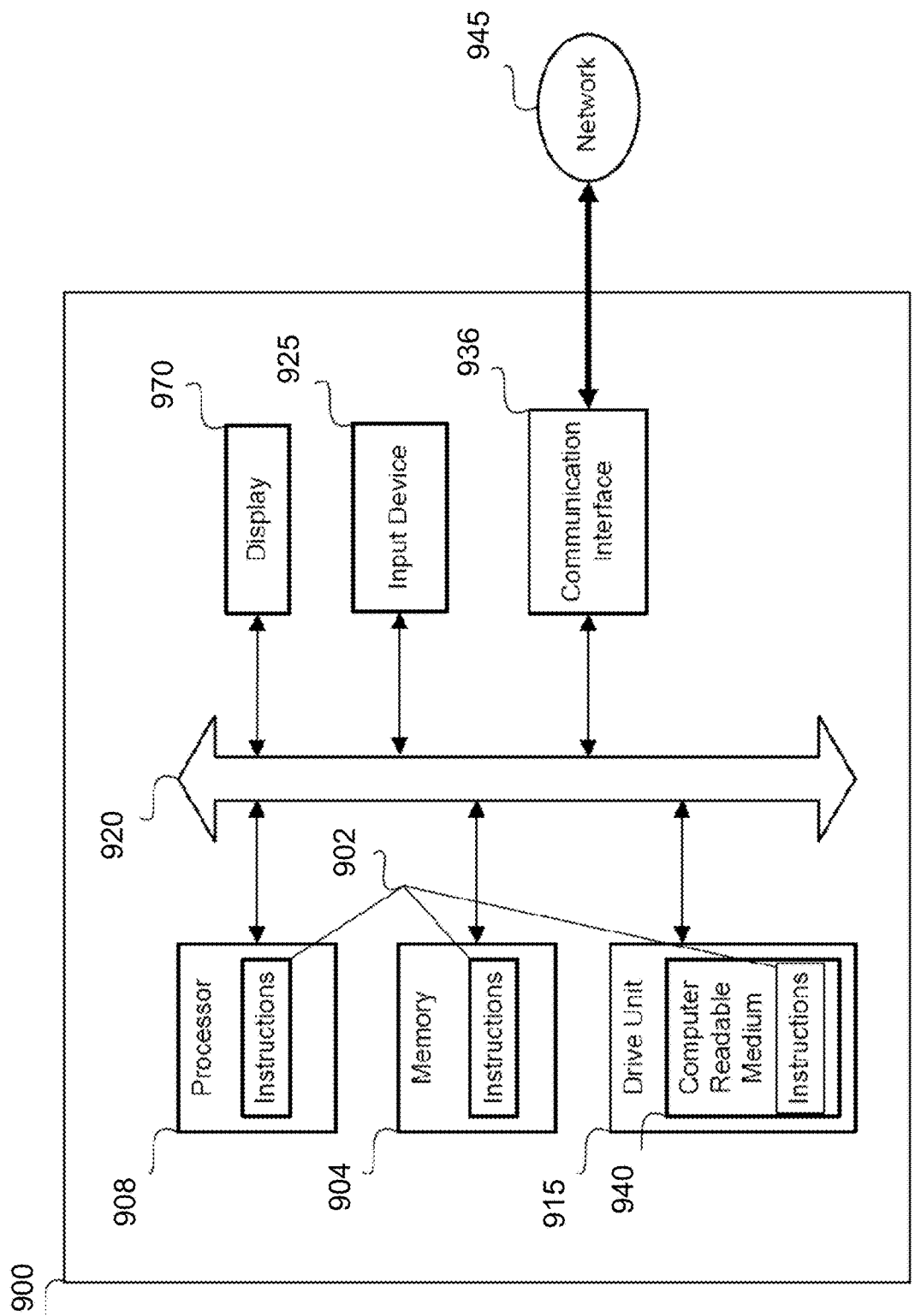
FIG. 9 is a diagram of an exemplary computer system that may be utilized to implement the methods and devices described herein.

FIG. 9 is a general computer system 900, programmable to be a specific computer system, which may represent any of the computing devices referenced herein, such as the sensor or the server. The computer system 900 may include an ordered listing of a set of instructions 902 that may be executed to cause the computer system 900 to perform any one or more of the methods or computer-based functions disclosed herein. The computer system 900 can operate as a stand-alone device or can be connected, e.g., using the network 945, to other computer systems or peripheral devices.

In a networked deployment, the computer system 900 can operate in the capacity of a server or as a client-user computer in a server-client user network environment, or as a peer computer system in a peer-to-peer (or distributed) network environment. The computer system 900 can also be implemented as or incorporated into various devices, such as a personal computer or a mobile computing device capable of executing a set of instructions 902 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 900 can include a memory 904 on a bus 920 for communicating information. Code operable to cause the computer system to perform any of the acts or operations described herein can be stored in the memory 904. The memory 904 can be a random-access memory, read-only memory, programmable memory, hard disk drive or any other type of volatile or non-volatile memory or storage device.

The computer system 900 can include a processor 908, such as a central processing unit (CPU) and/or a graphics processing unit (GPU). In one implementation, one example of a processor is a controller. Further, one example of a controller is a microcontroller. The processor 908 can include one or more general processors, digital signal processors, application specific integrated circuits, field programmable gate arrays, digital circuits, optical circuits, analog circuits, combinations thereof, or other now known or later-developed devices for analyzing and processing data. The processor 908 can implement the set of instructions 902 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 900 can also include a disk or optical drive unit 915. The disk drive unit 915 can include a computer-readable medium 940 in which one or more sets of instructions 902, e.g., software, can be embedded. Further, the instructions 902 can perform one or more of the operations as described herein. The instructions 902 can reside completely, or at least partially, within the memory 904 or within the processor 908 during execution by the computer system 900.

The memory 904 and the processor 908 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 900 can include an input device 925, such as a keyboard or mouse, configured for a user to interact with any of the components of system 900. It can further include a display 970, such as a liquid crystal display (LCD), a cathode ray tube (CRT), or any other display suitable for conveying information. The display 970 can act as an interface for the user to see the functioning of the processor 908, or specifically as an interface with the software stored in the memory 904 or the drive unit 915. Though typically an input device may not be present on sensor, programming of the sensor may be performed remotely, such as via the server, or locally via an interface on the sensor.

The computer system 900 can include a communication interface 936 that enables communications via the communications network 945. For example, communication functionality discussed above may comprise communication interface 936. The network 945 can include wired networks, wireless networks, or combinations thereof. The communication interface 936 network can enable communications via any number of communication standards, such as 802.11, 802.17, 802.20, WiMAX, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including FIGS. 1-3B and 7A-8B, may be implemented using the computer functionality disclosed in FIG. 9. Further, the flow diagrams illustrated in FIGS. 4A-C may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively, or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively, or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed:

Embodiment 1

A fluid optical characterization system comprising:
a single particle sensor comprising a first chamber and configured to generate single particle data indicative of detecting single particles for a fluid in the first chamber;
an ensemble measurement sensor comprising a second chamber and configured to generate ensemble measurement data indicative of detecting at least one of scattering wavelength or scattering angle of multiple particles for the fluid in the second chamber; and
processing functionality configured to:
access the single particle data and the ensemble measurement data; and
analyze, in combination, single particle analysis data and ensemble measurement analysis data in order to determine at least one property of the fluid, wherein the single particle analysis data comprises the single particle data or is derived from the single particle data, and wherein the ensemble measurement analysis data comprises the ensemble measurement data or is derived from the ensemble measurement data.

Embodiment 2

The fluid optical characterization system of embodiment 1:
wherein the single particle sensor comprises an optical particle counter (OPC) sensor; and
wherein the ensemble measurement sensor comprises one of a multiwavelength ensemble particle sensor or a multiangle ensemble particle sensor.

Embodiment 3

The fluid optical characterization system of any of embodiments 1 or 2,
wherein the fluid comprises an aerosol; and
wherein the at least one property of the fluid comprises at least one optical property of the aerosol.

Embodiment 4

The fluid optical characterization system of any of embodiments 1-3,
wherein the processing functionality is configured to analyze the single particle analysis data and the ensemble measurement analysis data in combination by:
correlating the single particle analysis data and the ensemble measurement analysis data; and
analyzing the correlation of the single particle analysis data and the ensemble measurement analysis data.

Embodiment 5

The fluid optical characterization system of any of embodiments 1-4,
wherein analyzing the correlation of the single particle analysis data and the ensemble measurement analysis data comprises fitting a line or a curve.

Embodiment 6

The fluid optical characterization system of any of embodiments 1-5,
wherein correlating the single particle analysis data and the ensemble measurement analysis data comprises graphing the single particle analysis data and the ensemble measurement analysis data; and wherein analyzing the correlation of the single particle analysis data and the ensemble measurement analysis data comprises fitting the line or the curve to the graph of the single particle analysis data and the ensemble measurement analysis data.

Embodiment 7

The fluid optical characterization system of any of embodiments 1-6,
wherein the processing functionality is configured to determine the at least one property of the fluid by comparing the fitted line or curve to a plurality of fitted lines or curves of known materials.

Embodiment 8

The fluid optical characterization system of any of embodiments 1-7,
wherein the OPC sensor outputs size distribution data;
wherein the processing functionality is configured to generate, based on the size distribution data, mass concentration data;
wherein the ensemble measurement analysis data comprises intensity data for at least one scattering wavelength; and
wherein graphing the single particle analysis data and the ensemble measurement analysis data comprises graphing the mass concentration data versus the intensity data.

Embodiment 9

The fluid optical characterization system of any of embodiments 1-8,
wherein the processing functionality is configured to iterate analyzing the single particle analysis data and the ensemble measurement analysis data in order to determine the at least one property of the fluid.

Embodiment 10

The fluid optical characterization system of any of embodiments 1-9,
wherein the single particle sensor comprises an optical particle counter (OPC) sensor;
wherein the ensemble measurement sensor comprises one of a multiwavelength ensemble particle sensor or a multi-angle ensemble particle sensor;
wherein the fluid comprises an aerosol;
wherein the processing functionality is configured to analyze, using an assumed optical characteristic, the single particle analysis data and the ensemble measurement analysis data in order to determine an optical characteristic; and
wherein the processing functionality is configured to iterate responsive to determining that the assumed optical characteristic is more than a preset amount different that the determined optical characteristic.

Embodiment 11

The fluid optical characterization system of any of embodiments 1-10,
wherein the single particle sensor comprises an optical particle counter (OPC) sensor;
wherein the ensemble measurement sensor comprises one of a multiwavelength ensemble particle sensor or a multi-angle ensemble particle sensor;
wherein the fluid comprises an aerosol;
further comprising a housing that houses the single particle sensor, the ensemble measurement sensor and the processing functionality; and
wherein the processing functionality is configured to determine at least one optical property of the aerosol locally within the housing.

Embodiment 12

The fluid optical characterization system of any of embodiments 1-11,
wherein the single particle sensor comprises an optical particle counter (OPC) sensor;
wherein the ensemble measurement sensor comprises one of a multiwavelength ensemble particle sensor or a multi-angle ensemble particle sensor;
wherein the fluid comprises an aerosol;
further comprising:
communication functionality; and
a housing that houses the single particle sensor, the ensemble measurement sensor and the communication functionality;
further comprising a server configured to perform the processing functionality;
wherein the communication functionality is configured to transmit the single particle analysis data and the ensemble measurement analysis data to the server; and
wherein the processing functionality resident on the server is configured to determine at least one optical property.

Embodiment 13

An aerosol optical characterization system comprising:
an optical particle counter comprising a first chamber and configured to generate single particle data indicative of detecting single particles for an aerosol in the first chamber;
an ensemble measurement device comprising a second chamber and configured to generate ensemble measurement data indicative of detecting at least one of scattering wavelength or scattering angle of multiple particles for the aerosol in the second chamber; and
processing functionality configured to:
access the single particle data and the ensemble measurement data; and
analyze, in combination, single particle analysis data and ensemble measurement analysis data in order to determine at least one optical property of the aerosol, wherein the single particle analysis data comprises the single particle data or is derived from the single particle data, and wherein the ensemble measurement analysis data comprises the ensemble measurement data or is derived from the ensemble measurement data.

Embodiment 14

The aerosol optical characterization system of embodiment 13:
wherein determining the at least one optical property of the aerosol comprises determining whether the aerosol is absorbing or scattering.

Embodiment 15

The aerosol optical characterization system of any of embodiments 13 or 14,

Embodiment 16

The aerosol optical characterization system of any of embodiments 13-15,
wherein the optical particle counter is housed within an optical particle counter housing and configured to output the single particle data to the processing functionality which is external to the optical particle counter housing; and
wherein the ensemble measurement device is housed within an ensemble measurement device housing and configured to output the ensemble measurement data to the processing functionality which is external to the ensemble measurement device housing, the optical particle counter housing being separate from the ensemble measurement device housing.

Embodiment 17

The aerosol optical characterization system of any of embodiments 13-16,
wherein the optical particle counter and the ensemble measurement device are housed within a common housing.

Embodiment 18

An aerosol characterization system comprising:
an inlet configured as a conduit for an aerosol;
a chamber in fluid communication with the inlet;
one or more sensors to sense, for a single particle in the chamber, particle counting data and multiwavelength or multiangle scattering data; and
processing functionality configured to analyze the particle counting data and the multiwavelength or multiangle scattering data in order to determine at least one property of the fluid.

Embodiment 19

The aerosol optical characterization system of embodiment 18,
wherein the one or more sensors comprise a laser and at least one of a spectrometer or photodetectors.

Embodiment 20

The aerosol optical characterization system of any of embodiments 18 or 19,
wherein the at least one of the spectrometer or the photodetectors are configured to generate a pulse height distribution at one or more wavelengths for the single particle.

Embodiment 21

The aerosol optical characterization system of any of embodiments 18-20,
wherein the at least one of the spectrometer or the photodetectors are configured to generate a pulse height distribution at one or more angles for the single particle.

Embodiment 22

The aerosol optical characterization system of any of embodiments 18-21,
wherein the at least one optical property of the aerosol comprises refractive index of the aerosol.

wherein the processing functionality is configured to generate a size distribution and a refractive index for the single particle.

Embodiment 23

The aerosol optical characterization system of any of embodiments 18-22,
wherein the aerosol characterization system consists of a single radiation source and a single spectrometer.

Embodiment 24

A method for performing functions recited in any of embodiments 1-12.

Embodiment 25

A method for performing functions recited in any of embodiments 13-17.

Embodiment 26

A method for performing functions recited in any of embodiments 18-23.

The invention claimed is:

1. A fluid optical characterization system comprising:
a single particle sensor comprising a first chamber and configured to generate single particle data indicative of detecting single particles for a fluid in the first chamber;
an ensemble measurement sensor comprising a second chamber and configured to generate ensemble measurement data indicative of detecting at least one of scattering wavelength or scattering angle of multiple particles for the fluid in the second chamber; and
processing functionality configured to:
access the single particle data and the ensemble measurement data; and
correlate single particle analysis data and ensemble measurement analysis data in order to determine at least one property of the fluid, wherein the single particle analysis data comprises the single particle data or is derived from the single particle data, and wherein the ensemble measurement analysis data comprises the ensemble measurement data or is derived from the ensemble measurement data.

2. The fluid optical characterization system of claim 1, wherein the single particle sensor comprises an optical particle counter (OPC) sensor; and
wherein the ensemble measurement sensor comprises one of a multiwavelength ensemble particle sensor or a multi-angle ensemble particle sensor.

3. The fluid optical characterization system of claim 2, wherein the fluid comprises an aerosol; and
wherein the at least one property of the fluid comprises at least one optical property of the aerosol.

4. The fluid optical characterization system of claim 3, wherein the processing functionality is configured to analyze the single particle analysis data and the ensemble measurement analysis data in combination by:
correlating the single particle analysis data and the ensemble measurement analysis data; and
analyzing the correlation of the single particle analysis data and the ensemble measurement analysis data.

5. The fluid optical characterization system of claim 4, wherein the analyzing of the correlation of the single particle analysis data and the ensemble measurement analysis data comprises fitting a line or a curve.

6. The fluid optical characterization system of claim 5, wherein the correlating of the single particle analysis data and the ensemble measurement analysis data comprises graphing the single particle analysis data and the ensemble measurement analysis data; and
    wherein the analyzing of the correlation of the single particle analysis data and the ensemble measurement analysis data comprises fitting the line or the curve to the graph of the single particle analysis data and the ensemble measurement analysis data.

7. The fluid optical characterization system of claim 6, wherein the processing functionality is configured to determine the at least one property of the fluid by comparing the fitted line or curve to a plurality of fitted lines or curves of known materials.

8. The fluid optical characterization system of claim 7, wherein the OPC sensor outputs size distribution data;
    wherein the processing functionality is configured to generate, based on the size distribution data, mass concentration data;
    wherein the ensemble measurement analysis data comprises intensity data for at least one scattering wavelength; and
    wherein the graphing of the single particle analysis data and the ensemble measurement analysis data comprises graphing the mass concentration data versus the intensity data.

9. The fluid optical characterization system of claim 1, wherein the processing functionality is configured to iterate correlating the single particle analysis data and the ensemble measurement analysis data in order to determine the at least one property of the fluid.

10. The fluid optical characterization system of claim 9, wherein the single particle sensor comprises an optical particle counter (OPC) sensor;
    wherein the ensemble measurement sensor comprises one of a multiwavelength ensemble particle sensor or a multi-angle ensemble particle sensor;
    wherein the fluid comprises an aerosol;
    wherein the processing functionality is configured to analyze, using an assumed optical characteristic, the single particle analysis data and the ensemble measurement analysis data in order to determine an optical characteristic; and
    wherein the processing functionality is configured to iterate responsive to determining that the assumed optical characteristic is more than a preset amount different than the determined optical characteristic.

11. The fluid optical characterization system of claim 1, wherein the single particle sensor comprises an optical particle counter (OPC) sensor;
    wherein the ensemble measurement sensor comprises one of a multiwavelength ensemble particle sensor or a multi-angle ensemble particle sensor;
    wherein the fluid comprises an aerosol;
    further comprising a housing that houses the single particle sensor, the ensemble measurement sensor and the processing functionality; and
    wherein the processing functionality is configured to determine at least one optical property of the aerosol locally within the housing.

12. The fluid optical characterization system of claim 1, wherein the single particle sensor comprises an optical particle counter (OPC) sensor;
    wherein the ensemble measurement sensor comprises one of a multiwavelength ensemble particle sensor or a multi-angle ensemble particle sensor;
    wherein the fluid comprises an aerosol;
    further comprising:
        communication functionality; and
        a housing that houses the single particle sensor, the ensemble measurement sensor and the communication functionality;
    further comprising a server configured to perform the processing functionality;
    wherein the communication functionality is configured to transmit the single particle analysis data and the ensemble measurement analysis data to the server; and
    wherein the processing functionality resident on the server is configured to determine at least one optical property.

13. An aerosol optical characterization system comprising:
    an optical particle counter comprising a first chamber and configured to generate single particle data indicative of detecting single particles for an aerosol in the first chamber;
    an ensemble measurement device comprising a second chamber and configured to generate ensemble measurement data indicative of detecting at least one of scattering wavelength or scattering angle of multiple particles for the aerosol in the second chamber; and
    processing functionality configured to:
        access the single particle data and the ensemble measurement data; and
        analyze single particle analysis data and ensemble measurement analysis data in order to determine a relationship between the single particle analysis data and the ensemble measurement analysis data;
    wherein the relationship is indicative of at least one characteristic of the aerosol; and
    wherein the single particle analysis data comprises the single particle data or is derived from the single particle data, and wherein the ensemble measurement analysis data comprises the ensemble measurement data or is derived from the ensemble measurement data.

14. The aerosol optical characterization system of claim 13, wherein the at least one characteristic comprises at least one optical property; and
    wherein determining the at least one optical property of the aerosol comprises determining whether the aerosol is absorbing or scattering.

15. The aerosol optical characterization system of claim 13, wherein the at least one characteristic comprises at least one optical property; and
    wherein the at least one optical property of the aerosol comprises refractive index of the aerosol.

16. The aerosol optical characterization system of claim 13, wherein the optical particle counter is housed within an optical particle counter housing and configured to output the single particle data to the processing functionality which is external to the optical particle counter housing; and
    wherein the ensemble measurement device is housed within an ensemble measurement device housing and configured to output the ensemble measurement data to the processing functionality which is external to the ensemble measurement device housing, the optical particle counter housing being separate from the ensemble measurement device housing.

17. The aerosol optical characterization system of claim 13, wherein the optical particle counter and the ensemble measurement device are housed within a common housing.

18. An aerosol characterization system comprising:
an inlet configured as a conduit for an aerosol;
a single chamber in fluid communication with the inlet;
one or more sensors to sense, for a single at least one particle in the single chamber, both particle counting data and multiwavelength or multiangle scattering data;
processing functionality configured to correlate or determine a relationship between the particle counting data and the multiwavelength or multiangle scattering data in order to determine at least one property of the fluid aerosol.

19. The aerosol characterization system of claim 18, wherein the one or more sensors comprises a laser and at least one of a spectrometer or photodetectors; and
wherein the at least one of the spectrometer or the photodetectors are configured to generate a pulse height distribution at one or more wavelengths for a single particle in the single chamber.

20. The aerosol characterization system of claim 18, wherein the one or more sensors comprises a laser and at least one of a spectrometer or photodetectors; and
wherein the at least one of the spectrometer or the photodetectors are configured to generate a pulse height distribution at one or more angles for a single particle in the single chamber.

21. The aerosol characterization system of claim 18, wherein the processing functionality is configured to generate a size distribution and a refractive index for a single particle in the single chamber.

22. The fluid optical characterization system of claim 1, wherein the processing functionality is configured to correlate the single particle analysis data and the ensemble measurement analysis data by identifying at least one correlation with at least one of:
a line fit;
one or more mathematical equations; or
machine learning; and
wherein the processing functionality is configured to determine the at least one property of the fluid by using the at least one correlation identified in order to characterize the fluid.

23. The fluid optical characterization system of claim 1, wherein the processing functionality is configured to correlate the single particle analysis data and the ensemble measurement analysis data by identifying at least one correlation; and
wherein the processing functionality is configured to match the at least one correlation identified with at least one previously measured correlations in order to determine the at least one property of the fluid.

24. The fluid optical characterization system of claim 1, wherein the fluid comprises an aerosol;
wherein the processing functionality is configured to correlate the single particle analysis data and the ensemble measurement analysis data by identifying at least one correlation; and
wherein the processing functionality is configured to use the at least one correlation identified in order to identify:
the aerosol;
an optical nature of the aerosol; or
an indication of refractive index of the aerosol.

25. The aerosol characterization system of claim 18, wherein the one or more sensors comprise:
a particle counting sensor including a part configured to sense the aerosol in order to generate the particle counting data; and
a multiwavelength or multiangle sensor including a part configured to sense the aerosol in order to generate the multiwavelength or multiangle scattering data; and
wherein the single chamber comprises a common chamber the part of the particle counting sensor configured to sense the aerosol and the part of the multiwavelength or multiangle sensor configured to sense the aerosol are housed within the common chamber.

26. The aerosol characterization system of claim 25, wherein the part of the particle counting sensor configured to sense the aerosol and the part of the multiwavelength or multiangle sensor configured to sense the aerosol are positioned in a single same common chamber such that a same particle in the aerosol in the common chamber generates the particle counting data and generates the multiwavelength or multiangle scattering data.

27. The aerosol characterization system of claim 18, wherein the aerosol characterization system consists of a single light source that is used to generate both the particle counting data and the multiwavelength or multiangle scattering data.

28. The aerosol characterization system of claim 27, wherein the aerosol characterization system consists of a single detector used to generate both the particle counting data and the multiwavelength scattering data.

29. The aerosol characterization system of claim 18, wherein the aerosol characterization system consists of a single detector used to generate both the particle counting data and the multiwavelength scattering data.

30. The aerosol characterization system of claim 29, wherein the single detector consists of a single spectrometer.

31. The aerosol characterization system of claim 18, wherein the aerosol characterization system comprises one or more lasers; and
wherein the aerosol characterization system consists of a plurality of photodetectors used to generate both the particle counting data and the multiwavelength or multiangle scattering data.

* * * * *

UNITED STATES PATENT AND TRADEMARK OFFICE
CERTIFICATE OF CORRECTION

PATENT NO. : 11,614,392 B2
APPLICATION NO. : 16/705648
DATED : March 28, 2023
INVENTOR(S) : Tandeep S. Chadha, Jiaxi Fang and Pratim Biswas It is certified that error appears in the above-identified patent and that said Letters Patent is hereby corrected as shown below:

On the Title Page

Item (74), Attorney, Agent, or Firm:
Please replace Lemnia with Lempia.

Signed and Sealed this
Fourth Day of July, 2023

Katherine Kelly Vidal
*Director of the United States Patent and Trademark Office*